(12) United States Patent
Koga et al.

(10) Patent No.: US 11,148,880 B1
(45) Date of Patent: Oct. 19, 2021

(54) REFUSE VEHICLE CONTROL SYSTEMS

(71) Applicant: Oshkosh Corporation, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Joshua D. Rocholl, Rochester, MN (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Dale Matsumoto, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 17/232,554

(22) Filed: Apr. 16, 2021

Related U.S. Application Data

(60) Provisional application No. 63/011,433, filed on Apr. 17, 2020.

(51) Int. Cl.
| | |
|---|---|
| *B65F 3/28* | (2006.01) |
| *B60R 25/01* | (2013.01) |
| *G05D 1/02* | (2020.01) |
| *B65F 3/04* | (2006.01) |
| *B65F 3/02* | (2006.01) |

(52) U.S. Cl.
CPC ............... *B65F 3/28* (2013.01); *B60R 25/01* (2013.01); *B65F 3/041* (2013.01); *G05D 1/021* (2013.01); *B65F 2003/0269* (2013.01); *B65F 2003/0279* (2013.01); *B65F 2210/168* (2013.01)

(58) Field of Classification Search
CPC .... B65F 3/28; B65F 3/041; B65F 2003/0269; B65F 2003/0279; B65F 2210/168; B60R 25/01; G05D 1/021
See application file for complete search history.

(56) References Cited

U.S. PATENT DOCUMENTS

| | | |
|---|---|---|
| 2,473,379 A | 6/1949 | Lindgren |
| 5,378,010 A | 1/1995 | Marino et al. |
| 5,919,027 A | 7/1999 | Christenson |

(Continued)

*Primary Examiner* — Saul Rodriguez
*Assistant Examiner* — Willie Berry, Jr.
(74) *Attorney, Agent, or Firm* — Foley & Lardner LLP

(57) ABSTRACT

A refuse vehicle includes a chassis, a body, a lock, a tailgate, an ejector, an actuator, and a processor. The body defines a receptacle for storing refuse. The lock is coupled to the body and is configured to releasably secure a movable tailgate. The receptacle contains the ejector. The ejector can transition from a first position that is spaced from the tailgate to a second position proximate the tailgate. The actuator is configured to transition the ejector from the first position to the second position. The processor is configured to selectively unlock the tailgate and transition the ejector from the first position to the second position in response to receiving a single input to thereby eject refuse from the receptacle without receiving multiple inputs.

20 Claims, 16 Drawing Sheets

(56) References Cited

U.S. PATENT DOCUMENTS

| | | |
|---|---|---|
| 5,934,853 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,105,984 A | 8/2000 | Schmitz et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,390,758 B1 | 5/2002 | McNeilus et al. |
| 6,447,239 B2 | 9/2002 | Young et al. |
| 6,474,928 B1 | 11/2002 | Christenson |
| 6,516,914 B1 | 2/2003 | Andersen et al. |
| 6,565,305 B2 | 5/2003 | Schrafel |
| 6,757,597 B2 | 6/2004 | Yakes et al. |
| 6,885,920 B2 | 4/2005 | Yakes et al. |
| 7,070,382 B2 | 7/2006 | Pruteanu et al. |
| 7,164,977 B2 | 1/2007 | Yakes et al. |
| 7,277,782 B2 | 10/2007 | Yakes et al. |
| 7,284,943 B2 | 10/2007 | Pruteanu et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,448,460 B2 | 11/2008 | Morrow et al. |
| 7,520,354 B2 | 4/2009 | Morrow et al. |
| 7,556,468 B2 | 7/2009 | Grata |
| 7,559,735 B2 | 7/2009 | Pruteanu et al. |
| 7,689,332 B2 | 3/2010 | Yakes et al. |
| 7,711,460 B2 | 5/2010 | Yakes et al. |
| 7,848,857 B2 | 12/2010 | Nasr et al. |
| 7,878,750 B2 | 2/2011 | Zhou et al. |
| 7,931,103 B2 | 4/2011 | Morrow et al. |
| 8,000,850 B2 | 8/2011 | Nasr et al. |
| 8,139,109 B2 | 3/2012 | Schmiedel et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,561,735 B2 | 10/2013 | Morrow et al. |
| 8,807,613 B2 | 8/2014 | Howell et al. |
| 8,947,531 B2 | 2/2015 | Fischer et al. |
| 9,045,014 B1 | 6/2015 | Verhoff et al. |
| 9,174,686 B1 | 11/2015 | Messina et al. |
| 9,205,262 B2 | 12/2015 | Bolea et al. |
| 9,216,856 B2 | 12/2015 | Howell et al. |
| 9,387,985 B2 | 7/2016 | Gillmore et al. |
| 9,420,203 B2 | 8/2016 | Broggi et al. |
| 9,656,640 B1 | 5/2017 | Verhoff et al. |
| 9,707,869 B1 | 7/2017 | Messina et al. |
| 9,757,564 B2 | 9/2017 | Bolea et al. |
| 9,880,581 B2 | 1/2018 | Kuriakose et al. |
| 9,950,159 B2 | 4/2018 | Beck et al. |
| 9,981,803 B2 | 5/2018 | Davis et al. |
| 10,052,484 B2 | 8/2018 | Bolea et al. |
| 10,196,205 B2 | 2/2019 | Betz et al. |
| D843,281 S | 3/2019 | Gander et al. |
| 10,327,810 B2 | 6/2019 | Shiroff et al. |
| 10,414,067 B2 | 9/2019 | Datema et al. |
| 10,434,995 B2 | 10/2019 | Verhoff et al. |
| 10,457,533 B2 | 10/2019 | Puszkiewicz et al. |
| D871,283 S | 12/2019 | Gander et al. |
| 10,558,234 B2 | 2/2020 | Kuriakose et al. |
| D888,629 S | 6/2020 | Gander et al. |
| 10,781,090 B2 | 9/2020 | Puszkiewicz et al. |
| 10,800,605 B2 | 10/2020 | Rocholl et al. |
| 10,843,379 B2 | 11/2020 | Rocholl et al. |
| 10,858,184 B2 | 12/2020 | Betz et al. |
| 10,859,167 B2 | 12/2020 | Jax et al. |
| 10,864,375 B2 | 12/2020 | Bolea et al. |
| D907,544 S | 1/2021 | Wall et al. |
| 10,899,538 B2 | 1/2021 | Nelson et al. |
| D909,934 S | 2/2021 | Gander et al. |
| 10,987,829 B2 | 4/2021 | Datema et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,021,078 B2 | 6/2021 | Rocholl et al. |
| 11,046,329 B2 | 6/2021 | Clifton et al. |
| 11,059,436 B2 | 7/2021 | Wildgrube et al. |
| 2002/0159870 A1 | 10/2002 | Pruteanu et al. |
| 2003/0231944 A1 | 12/2003 | Weller et al. |
| 2004/0071537 A1 | 4/2004 | Pruteanu et al. |
| 2004/0156706 A1 | 8/2004 | Weller et al. |
| 2006/0045700 A1 | 3/2006 | Siebers et al. |
| 2007/0088469 A1 | 4/2007 | Schmiedel et al. |
| 2007/0138817 A1 | 6/2007 | Calliari et al. |
| 2007/0154295 A1 | 7/2007 | Kuriakose |
| 2008/0038106 A1 | 2/2008 | Spain |
| 2008/0150350 A1 | 6/2008 | Morrow et al. |
| 2009/0194347 A1 | 8/2009 | Morrow et al. |
| 2010/0166531 A1 | 7/2010 | Bauer et al. |
| 2010/0301668 A1 | 12/2010 | Yakes et al. |
| 2012/0282077 A1 | 11/2012 | Alberts et al. |
| 2013/0085546 A1 | 4/2013 | Bolea et al. |
| 2013/0239827 A1* | 9/2013 | Zimmerman ......... B30B 9/3057 100/240 |
| 2016/0059011 A1 | 3/2016 | Bolea et al. |
| 2016/0310732 A1 | 10/2016 | Beck et al. |
| 2017/0341860 A1 | 11/2017 | Dodds et al. |
| 2017/0368341 A1 | 12/2017 | Bolea et al. |
| 2018/0008311 A1 | 1/2018 | Shiroff et al. |
| 2018/0118160 A1* | 5/2018 | Turner ................ B60R 25/2018 |
| 2018/0221659 A1 | 8/2018 | Beck et al. |
| 2018/0265289 A1 | 9/2018 | Davis et al. |
| 2018/0345013 A1 | 12/2018 | Bolea et al. |
| 2019/0185077 A1 | 6/2019 | Smith et al. |
| 2019/0193934 A1 | 6/2019 | Rocholl et al. |
| 2019/0322321 A1 | 10/2019 | Schwartz et al. |
| 2019/0344475 A1 | 11/2019 | Datema et al. |
| 2019/0351883 A1 | 11/2019 | Verhoff et al. |
| 2019/0360600 A1 | 11/2019 | Jax et al. |
| 2020/0262328 A1 | 8/2020 | Nelson et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0348661 A1 | 11/2020 | Clifton et al. |
| 2020/0348764 A1 | 11/2020 | Clifton et al. |
| 2020/0398670 A1 | 12/2020 | Rocholl et al. |
| 2020/0398695 A1 | 12/2020 | Rocholl et al. |
| 2020/0398697 A1 | 12/2020 | Rocholl et al. |
| 2020/0398772 A1 | 12/2020 | Wildgrube et al. |
| 2020/0398857 A1 | 12/2020 | Clifton et al. |
| 2020/0399057 A1 | 12/2020 | Rocholl et al. |
| 2020/0399058 A1 | 12/2020 | Rocholl et al. |
| 2020/0402325 A1 | 12/2020 | Koga et al. |
| 2021/0002112 A1 | 1/2021 | Puszkiewicz et al. |
| 2021/0031611 A1 | 2/2021 | Yakes et al. |
| 2021/0031612 A1 | 2/2021 | Yakes et al. |

(56) References Cited

U.S. PATENT DOCUMENTS

| | | |
|---|---|---|
| 2021/0031649 A1 | 2/2021 | Messina et al. |
| 2021/0054942 A1 | 2/2021 | Jax et al. |
| 2021/0069934 A1 | 3/2021 | Rocholl et al. |
| 2021/0086991 A1 | 3/2021 | Betz et al. |
| 2021/0213642 A1 | 7/2021 | Datema et al. |
| 2021/0221216 A1 | 7/2021 | Yakes et al. |
| 2021/0225095 A1 | 7/2021 | Koga et al. |
| 2021/0229755 A1 | 7/2021 | Schwartz et al. |
| 2021/0229908 A1 | 7/2021 | Rocholl et al. |

* cited by examiner

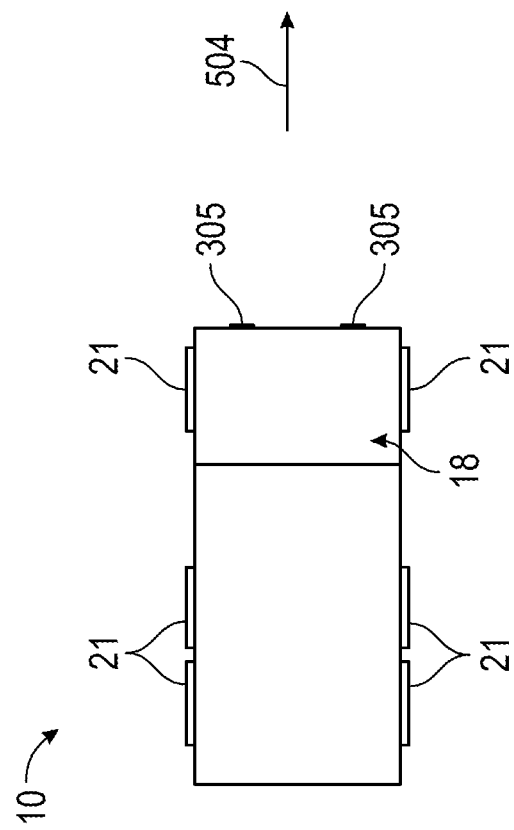
FIG. 15

REFUSE VEHICLE CONTROL SYSTEMS

CROSS-REFERENCE TO RELATED APPLICATION

This application claims the benefit of U.S. Provisional Patent Application No. 63/011,433, filed Apr. 17, 2020, which is incorporated herein by reference in its entirety.

BACKGROUND

Refuse vehicles collect a wide variety of waste, trash, and other material from residences and businesses. Operators of the refuse vehicle transport the material from various waste receptacles within a municipality to a storage or processing facility (e.g., a landfill, an incineration facility, a recycling facility, etc.). Once the refuse vehicle arrives at the storage or processing facility, the refuse is removed from an on-board receptacle (e.g., a hopper and a storage volume). Refuse vehicles often have a dump body configurations where refuse is removed from the on-board receptacle by raising the front end of the receptacle.

SUMMARY

One exemplary embodiment relates to a refuse vehicle. The refuse vehicle includes a chassis, a body, a lock, a tailgate, an ejector, an actuator, and a processor. The vehicle body is supported by the chassis and defines a receptacle for storing refuse. The receptacle has a first end and an opposing second end. The lock is coupled to the vehicle body and is selectively repositionable between a locked position and an unlocked position. The tailgate is positioned at the second end of the receptacle. The tailgate is pivotally coupled to the body and is selectively repositionable between an open position and a closed position. The tailgate is configured to be releasably secured in the closed position by the lock. The ejector system is positioned within the receptacle and is slidable within the receptacle between a first position that is spaced from the tailgate and a second positon proximate the tailgate. The actuator is coupled to the body and the ejector. The actuator is configured to transition the ejector between the first position and the second position. The processor is configured to provide command signals to (a) selectively reconfigure the lock into the unlocked position to unlock the tailgate and (b) transition the ejector from the first position to the second position both in response to receiving a single input to thereby eject refuse from the receptacle without receiving multiple input commands.

Another exemplary embodiment relates to a refuse vehicle. The refuse vehicle includes a chassis, a body, a lock, a tailgate, an ejector, a processor, an actuator, and a second actuator. The body is supported by the chassis and defines a receptacle for storing refuse. The receptacle has a first end, an opposing second end, a first position, and an angularly offset position. The receptacle is selectively repositionable between the first position and the angularly offset second position. The lock is coupled to the body and is selectively repositionable between a locked position and an unlocked position. The tailgate is positioned at the second end of the receptacle. The tailgate is pivotally coupled to the body and is selectively repositionable between an open position and a closed position. The tailgate is configured to be releasably secured in the closed position by the lock. The ejector is positioned within the receptacle. The ejector is slidable within the receptacle. The processor is configured to provide command signals to selectively reconfigure the lock into the unlocked position to unlock the tailgate in response to receiving a single input to thereby eject refuse from the receptacle without receiving multiple input commands. The actuator is coupled to the tailgate and the body. The actuator is in communication with the processor and is configured to transition the tailgate from the closed position to the open position in response to the single input. The second actuator is coupled to the chassis and the receptacle. The second actuator is selectively movable to transition the receptacle between the first position and the second position, and is in communication with the processor.

Still another exemplary embodiment relates to a method for controlling a refuse vehicle with a processor. The method includes receiving a single input, unlocking a lock coupled to the vehicle body to release a movable tailgate after receiving the input, extending an ejector from a first position to a second position after receiving the input and unlocking the lock, driving the refuse vehicle forward while the ejector is extending from a first position to a second position, and retracting the ejector from the second position to the first position.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 15 is a top view of a refuse vehicle in operation, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a refuse vehicle includes a processor in communication with several subsystems on the refuse vehicle, including the lifting system (e.g., front-loading arms, side-loading arm and jaw assembly), an actuator configured to raise and lower an on-board receptacle of the refuse vehicle, an actuator configured to manipulate a position of a tailgate of the refuse vehicle, a locking mechanism selectively securing the tailgate to the refuse vehicle body, a sensor system, and a throttle and/or clutch of the refuse vehicle. The processor is configured so that, upon receiving a singular input to execute a refuse dumping process, the processor can fully execute a refuse dumping process (e.g., a process where waste within the receptacle is removed) without any further input from an operator. According to an exemplary embodiment, a refuse vehicle removes common sources of error and lost time by fully automating the refuse dumping process. The refuse vehicle described in an exemplary embodiment improves the speed, efficiency, and operator safety during the performance of daily tasks.

Figure 1:
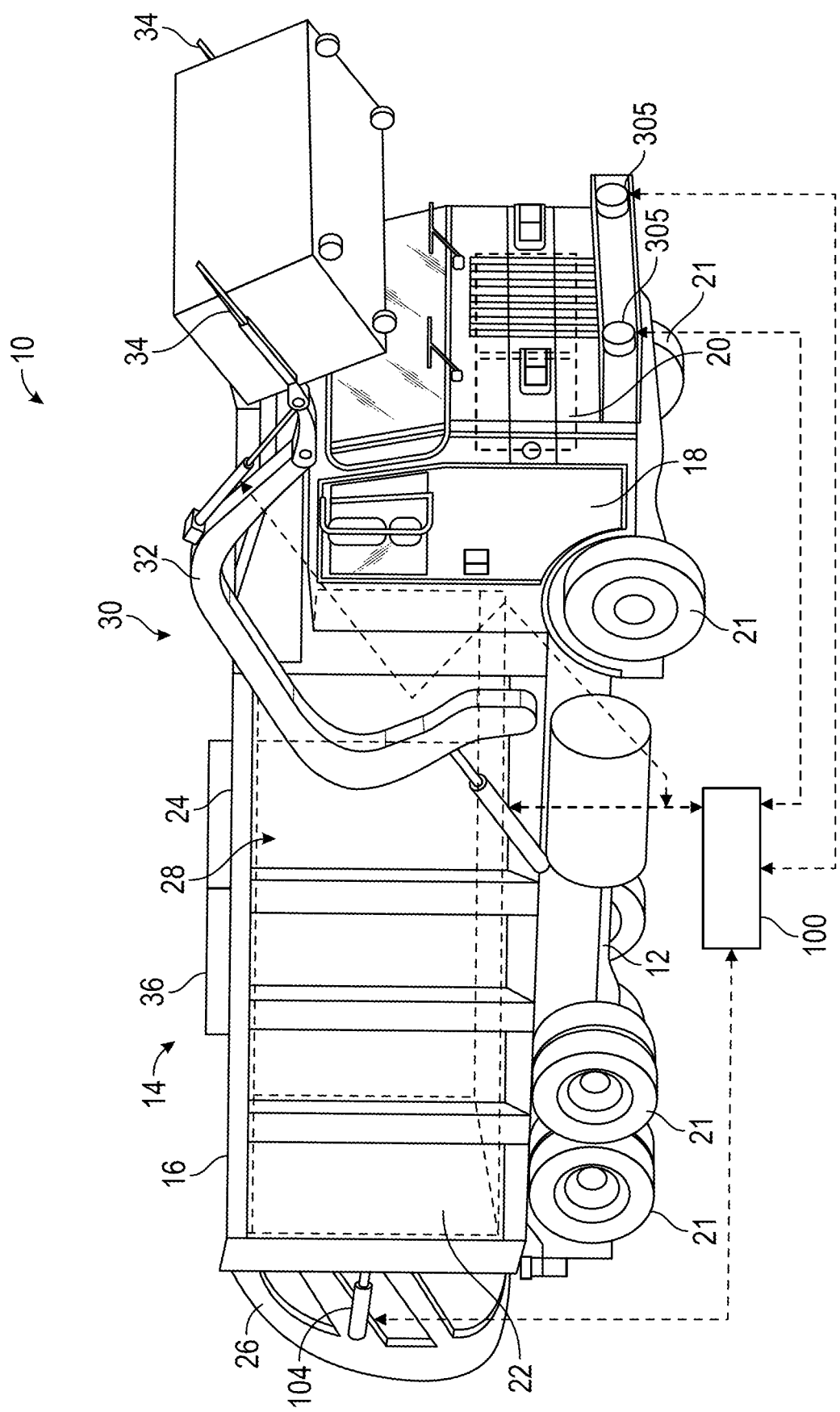
FIG. 1 is a perspective view of a front loading refuse vehicle according to an exemplary embodiment.
Figure 2:
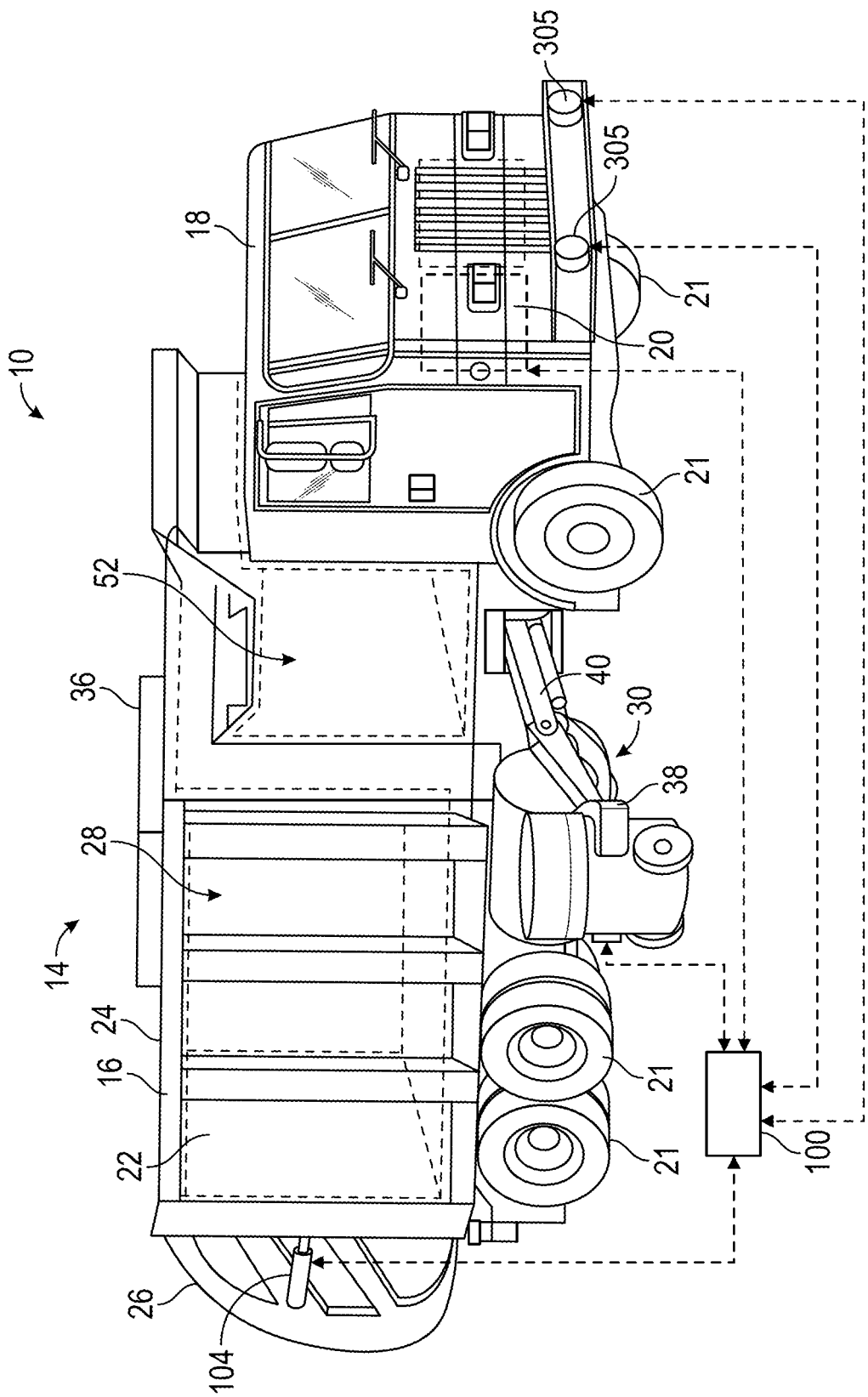
FIG. 2 is a perspective view of a side loading refuse vehicle according to an exemplary embodiment.
Figure 11:
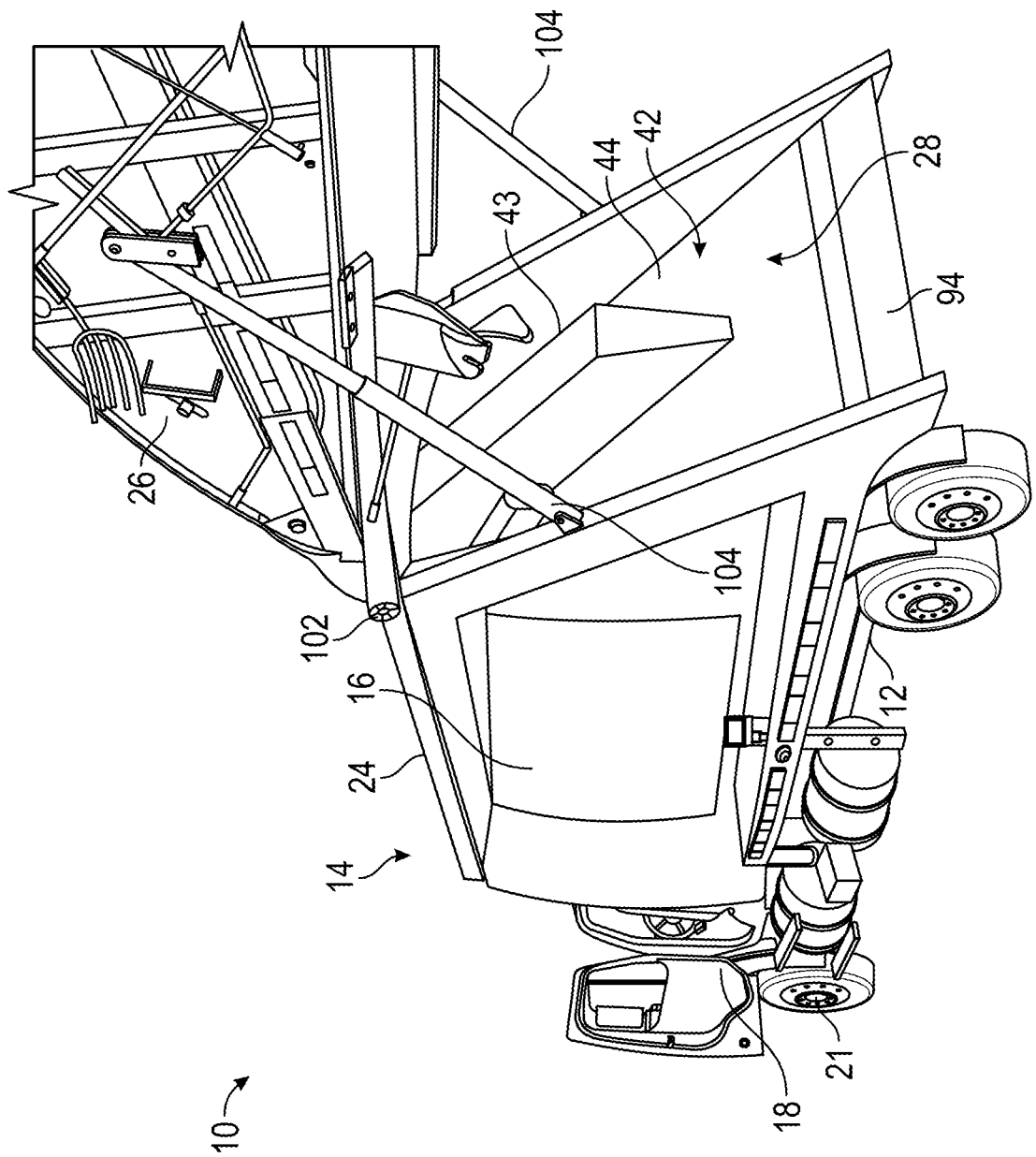
FIG. 11 is a rear perspective view of a rear loading refuse vehicle according to an exemplary embodiment, shown with a portion of the body assembly raised away from a chassis of the refuse vehicle to empty refuse from within the body assembly.

As shown in FIGS. 1, 2 and 11, a vehicle, shown as refuse vehicle 10 (e.g., garbage truck, waste collection truck, sanitation truck, etc.), includes a chassis, shown as a frame 12, and a body assembly, shown as body 14, coupled to the frame 12. The body 14 defines an on-board receptacle 16 and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processors, etc.). The refuse vehicle 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). The prime mover 20 may be configured to use a variety of fuels (e.g., gasoline, diesel, bio-diesel, ethanol, natural gas, etc.), according to various exemplary embodiments. According to an alternative embodiment, the prime mover 20 is one or more electric motors coupled to the frame 12. The electric motors may consume electrical power from an on-board storage device (e.g., batteries, ultra-capacitors, etc.), from an on-board generator (e.g., an internal combustion engine, high efficiency solar panels, regenerative braking system, etc.), or from an external power source (e.g., overhead power lines) and provide power to the systems of the refuse vehicle 10. According to some embodiments, the refuse vehicle 10 may be in other configurations than shown in FIG. 1. The refuse vehicle 10, may be in configurations such as a front loader, side loader, rear loader, or curb-sort recycling configuration.

According to an exemplary embodiment, the refuse vehicle 10 is configured to transport refuse from various waste receptacles within a municipality to a storage or processing facility (e.g., a landfill, an incineration facility, a recycling facility, etc.). As shown in FIGS. 1-2 and 11, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-2 and 11, the on-board receptacle 16 and collection chamber 28 are each positioned behind the cab 18. In some embodiments, the collection chamber 28 includes a hopper volume and a storage volume. Refuse is initially loaded into the hopper volume 52 by a manual (e.g. by hand) or automatic means (e.g., lifting system 30) and is thereafter compacted into the storage volume. According to an exemplary embodiment, the hopper volume 52 is positioned between the storage volume and the cab 18 (i.e., refuse is loaded into a position behind the cab 18 and stored in a position further toward the rear of the refuse vehicle 10).

As shown in FIG. 1, the refuse vehicle 10 is a front-loading refuse vehicle. In an embodiment, the refuse vehicle 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). According to an exemplary embodiment, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). As shown in FIG. 1, the arms 32 are rotated to lift the refuse container over the cab 18. A second actuator (e.g., a hydraulic cylinder articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.). The top door 36 may be independently actuated by a dedicated actuator coupled to the cover 24 and the top door 36, and in communication with the processor 100, or may be actuated by the movement of the lifting system 30 through a linkage system such that movement of the arms 32 creates translational movement of the top door 36 parallel to the surface of the cover 24. For example, a modified crank slider mechanism may be implemented to convert the rotary motion of arms 32 into reciprocating linear motion along a plane parallel to the plane containing the cover 24.

As shown in FIG. 2, the refuse vehicle 10 is a side-loading refuse vehicle that includes a lifting system 30, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Figure 3:
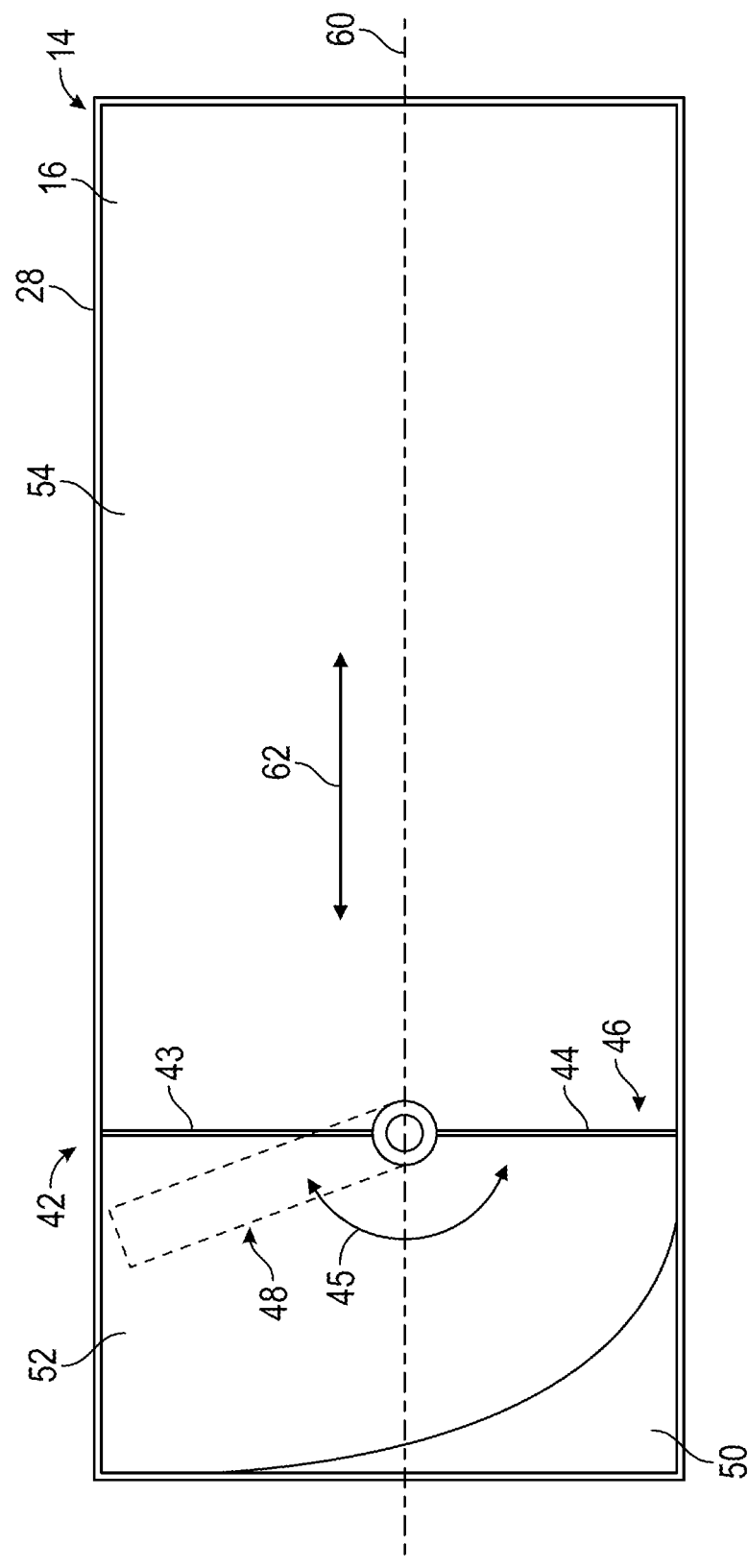
FIG. 3 is a sectional view of a body assembly of a refuse vehicle having an ejector, according to an exemplary embodiment.

As shown in FIG. 3, an ejector system (e.g., an ejector), shown as ejector assembly 42 (e.g., press, compactor, packer, etc.), is positioned within the collection chamber 28 of the body 14. According to an exemplary embodiment, the ejector assembly 42 is configured and positioned to fully eject refuse from refuse vehicle 10, while also serving as a refuse compactor within the on-board receptacle 16. As shown in FIG. 3, the collection chamber 28 defines a hopper volume, shown as hopper volume 52, and a storage volume, shown as storage volume 54. The on-board receptacle 16 of the body 14 extends along a longitudinal axis, shown as longitudinal axis 60, according to an exemplary embodiment.

As shown in FIG. 3, the ejector assembly 42 is configured to compact the refuse within hopper volume 52 into storage volume 54 and thereafter compact refuse within storage volume 54 along a direction, shown as direction 62, thereby increasing the carrying capacity of the refuse vehicle 10. The direction 62 may extend along (e.g., be parallel with, etc.) the longitudinal axis 60. As shown in FIG. 3, the on-board receptacle 16 of the body 14 includes a ramp, shown as the ramp 50. In some embodiments, the ramp 50 is integrally formed with body 14. In other embodiments, the ramp 50 is formed as a sub-component and thereafter coupled (e.g., welded, bolted, etc.) to the body 14. The ramp 50 may be disposed within hopper volume 52 of the body 14. According to an exemplary embodiment, the ramp 50 is positioned to direct refuse from hopper volume 52 toward the storage volume for compaction by ejector assembly 42. In some embodiments, the ejector assembly 42 utilizes hydraulic power to compact the refuse from hopper volume 52 into storage volume 54.

As shown in FIG. 3, ejector assembly 42 includes a wall, shown as the wall 43, and a panel, shown as a packer 44. The packer 44 is coupled to wall 43 and is selectively rotatable about an axis through a swing arc, shown as swing arc 45. Specifically, a pair of couplings pivotally and fixedly couple an end of the packer 44 to the wall 43 so that the packer 44 pivots about an axis orthogonal to the longitudinal axis 60 and perpendicular to the plane containing swing arc 45. According to the exemplary embodiment shown in FIG. 3, the packer 44 is selectively rotatable between a closed position, shown as closed position 46, and an open position, shown as open position 48.

Figure 4:
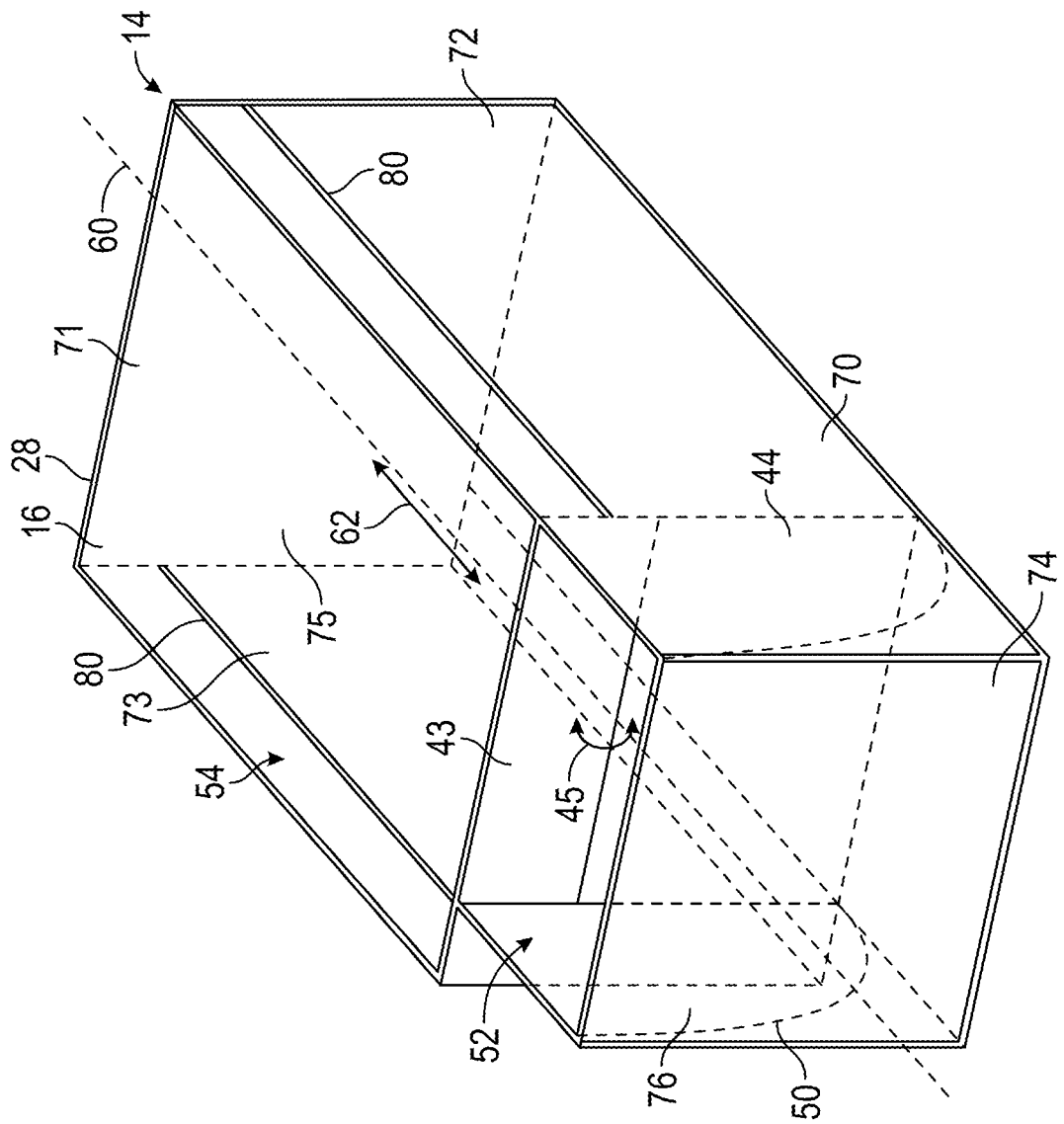
FIGS. 4 and 5 are front perspective views of the body assembly of FIG. 3.

As shown in FIG. 4, a front perspective view of the on-board receptacle 16 of the body 14 is shown. According to an exemplary embodiment, the body 14 includes a plurality of panels. In some embodiments, the on-board receptacle 16 is shaped as a generally rectangular box having two transverse upper edges, two longitudinal upper edges, two transverse lower edges, and two longitudinal lower edges. The longitudinal edges extend along the length of the on-board receptacle 16 (e.g., the longer dimension, along longitudinal axis 60, etc.), and the transverse edges extend across the length of the on-board receptacle 16, according to an exemplary embodiment. As shown in FIG. 4, the on-board receptacle 16 includes a lowermost panel, shown as panel 70, an uppermost panel, shown as panel 71, a first side panel, shown as panel 72, a second side panel, shown as panel 73, a foremost panel, shown as panel 74, and a rearmost panel, shown as panel 75. In some examples, the rear panel 75 is formed as part of the tailgate 26.

As shown in FIG. 4, the on-board receptacle 16 includes a floor (e.g., panel 70, etc.). In one embodiment, the floor is flat (e.g., not curved, etc.). According to an exemplary embodiment, the on-board receptacle 16 includes a ceiling (e.g., panel 71, etc.) that is convex and curves upward. In some embodiments, panel 71 is curved along the entire length of the on-board receptacle 16. The on-board receptacle may include a first side panel (e.g., panel 72, etc.) and a second side panel (e.g., panel 73, etc.). The panel 72 and the panel 73 may be convex and curve outward. The panel 72 and the panel 73 may have the same or different curvatures. The panel 71, panel 72, and panel 73 may be curved along the entire length of on-board receptacle 16. In some embodiments, the panel 71, panel 72, and panel 73 are curved along only a portion of the length of storage volume 54 and/or only a portion of the length of hopper volume 52. The weight of on-board receptacle 16 having the panel 71, panel 72, and panel 73 is less than the weight of a traditional body assembly. Panel 71, panel 72, and panel 73 may provide a weight reduction in part due to the high strength-to-weight ratio of panel 71, panel 72, and panel 73 relative to traditional, flat panels. The on-board receptacle 16 having panel 71, panel 72, and panel 73 with an increased strength-to-weight ratio may have fewer lateral sub-frame members (e.g., cross members) and smaller longitudinal sub-frame members (e.g., ribs, rails, etc.) relative to traditional refuse bodies, decreasing the overall weight of the on-board receptacle 16 without decreasing the refuse-carrying capabilities of refuse vehicle 10. The curvature of panel 71, panel 72, and panel 73 may reduce the peak stresses acting on panel 71, panel 72, and panel 73.

In some embodiments, the panel 70 is concave and curves downward. In some embodiments, the panel 70 is curved along the entire length of the on-board receptacle 16 and reduces the displacement of cantilevered portions of the panel 70 during loading. According to an exemplary embodiment, the panel 70 is curved in both hopper volume 52 and in storage volume 54 of collection chamber 28.

According to an exemplary embodiment, the on-board receptacle 16 includes a panel 76. The panel 76 is laterally offset from at least one of the panel 72 and the panel 73, according to an exemplary embodiment. The panel 76 may partially define hopper volume 52. In some embodiments, the panel 76 and the panel 73 are coplanar such that panel the 76 and the panel 73 form a continuous panel. The panel 73 and the panel 76 may be formed as separate components and thereafter coupled (e.g., welded, bolted, etc.) together. In other embodiments, the panel 76 and the panel 73 are integrally formed and are defined by portions of the same panel.

According to some embodiments, the hopper volume 52 has a width (e.g., a lateral distance between panel 72 and panel 76, etc.) that is smaller than a width of storage volume 54 (e.g., a lateral distance between panel 72 and panel 74, etc.). As shown in FIG. 4, the wall 43 extends downward from panel 71. According to some embodiments, the wall 43 does not extend to the panel 70. By way of example, the packer 44 may extend from a lower edge of wall 43 to the panel 70.

As shown in FIG. 4, the wall 43 translates within the on-board receptacle 16 of the body 14 along a first track, shown as first rail 80, and a second track, shown as second rail 80. In some embodiments, the first rail 80 and the second rail 80 are formed by a portion of the body 14. In other embodiments, the first rail 80 and the second rail 80 are separate components that are coupled (e.g., welded, bolted, etc.) to one or more other components of the on-board receptacle 16. As shown in FIG. 4, the first rail 80 and the second rail 80 extend along the length of the storage volume 54 in a direction that is parallel to longitudinal axis 60. The rails 80 may facilitate longitudinal motion of wall 43 within the storage volume 54.

The wall 43 may have one or more receivers configured to interface with (e.g., slidably engage, etc.) first rail 80 and second rail 80. In one embodiment, the receivers include openings or slots configured to receive the rails 80. In other embodiments, the receivers include shoes, rails, and/or projections that are received by (e.g., slot into, etc.) rails 80. The receiver may be coupled to various portions of wall 43 (e.g., positioned along a longitudinal edge of wall 43, etc.). In some embodiments, the receivers are positioned at a lower end of the wall 43. In other embodiments, the wall 43 includes multiple receivers on each lateral side. The receivers may be formed integrally with the wall 43. In still other embodiments, the receivers are separate components that are coupled (e.g., welded, bolted, etc.) to wall 43.

Refuse is compacted within the storage volume 54 with a compaction stroke. During the compaction stroke, the wall 43 translates within the storage volume 54 on the first and second rails 80 along a longitudinal axis 60. As shown in FIG. 4, the longitudinal axis 60 is parallel to the direction 62 of body 14. After the compaction stroke, the wall 43 retracts by translating within storage volume 54 on the rails 80.

Figure 5:
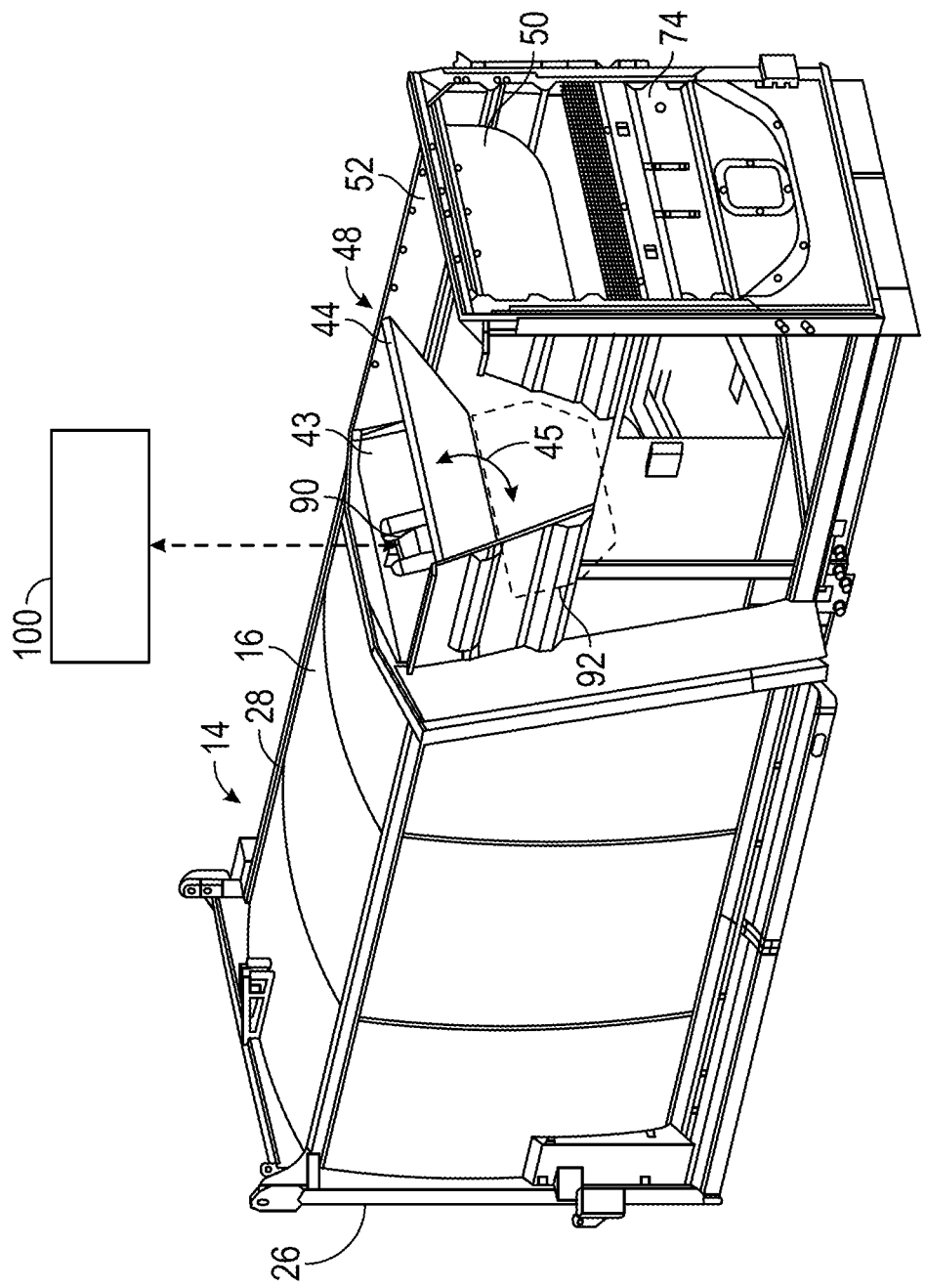
Figure 6:
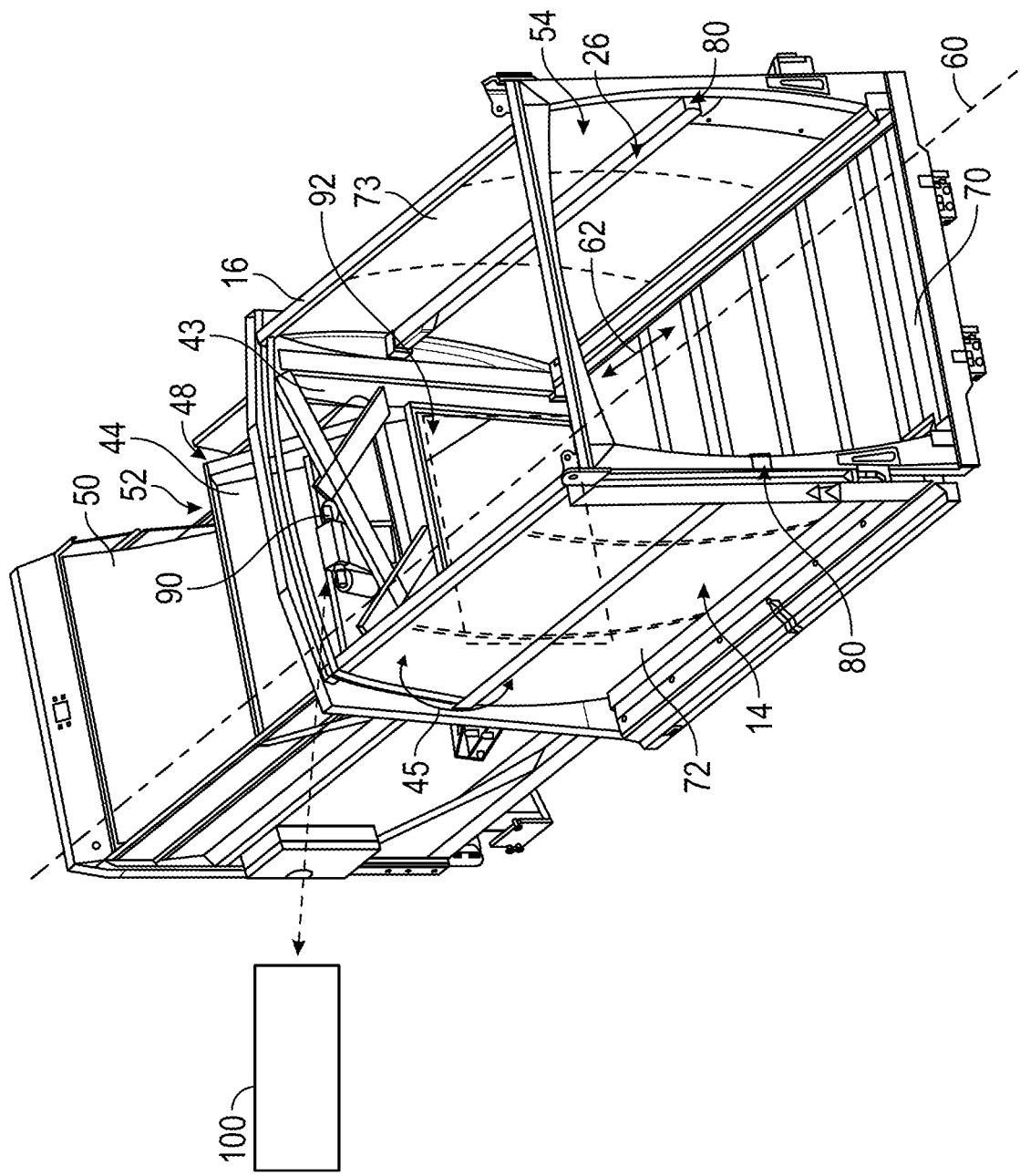
FIG. 6 is a rear perspective view of the body assembly of FIG. 3.

As shown in FIGS. 5 and 6, the wall 43 is in a retracted position (e.g., in a position toward the front of the on-board receptacle 16, etc.), and packer 44 is in open position 48 such that refuse may be emptied into hopper volume 52 of collection chamber 28. As shown in FIGS. 5 and 6, the ejector assembly 42 includes an actuator, shown as an actuator assembly 90. According to an exemplary embodiment, the actuator assembly 90 is positioned to selectively reposition packer 44. In some embodiments, the actuator assembly 90 includes a linear actuator having a first end coupled to packer 44 and a second end coupled to wall 43. The actuator assembly 90 can further include a cylinder or actuator to provide lateral force to the wall and packer 44 sufficient to displace the packer 44 and wall 43 along the rails 80 to execute a compaction or ejection stroke. The actuator assembly 90 is in communication with a processing unit, shown as processor 100. The processor 100 monitors the position of the actuator assembly 90 and the ejector assembly 42 (e.g., through communication with a position sensor within the actuator assembly 90) within the on-board receptacle 16 and controls the actuator assembly 90 to move the ejector assembly 42 in order to execute a compaction stroke or an ejection stroke, for example.

As shown in FIG. 5, a front perspective view of the on-board receptacle 16 is shown. According to an exemplary embodiment, the wall 43 at least partially defines an opening, shown as the opening 92. In some embodiments, the opening 92 extends from a lowermost edge of wall 43 to a floor (e.g., the panel 70, etc.) of the collection chamber 28. When selectively repositioned into the closed position 46, the packer 44 may at least partially close (e.g., span, be disposed over, covers, etc.) the opening 92.

As shown in FIG. 5, the ramp 50 is shaped to direct refuse within hopper volume 52 toward the opening 92 so that the refuse is compacted into storage volume 54 through the opening 92 as the packer 44 rotates from the open position 48 to a closed position 46. The ramp 50 may be curved, angled, and/or otherwise shaped to facilitate such direction of refuse. As shown in FIG. 5, the ramp 50 has a width equal to the width of the hopper volume 52. The ramp 50 may be coupled (e.g., welded, bolted, etc.) to the panel 74. The ramp 50 is positioned to direct refuse from the hopper volume (e.g., hopper volume 52) toward the opening 92. In some embodiments, the closed position 46 is angularly offset from a plane within which the wall 43 extends such that packer 44 rotates through the opening 92.

As shown in FIG. 6, the wall 43 has a width that is greater than the width of the opening 92 (i.e., the wall 43 is wider than the opening 92, etc.). According to the exemplary embodiment shown in FIG. 6, the opening 92 has a side edge that is spaced a lateral offset distance inward relative to at least one of the panel 72 and the panel 73. The opening 92 may have a width equal to the width of hopper volume 52.

Figure 7:
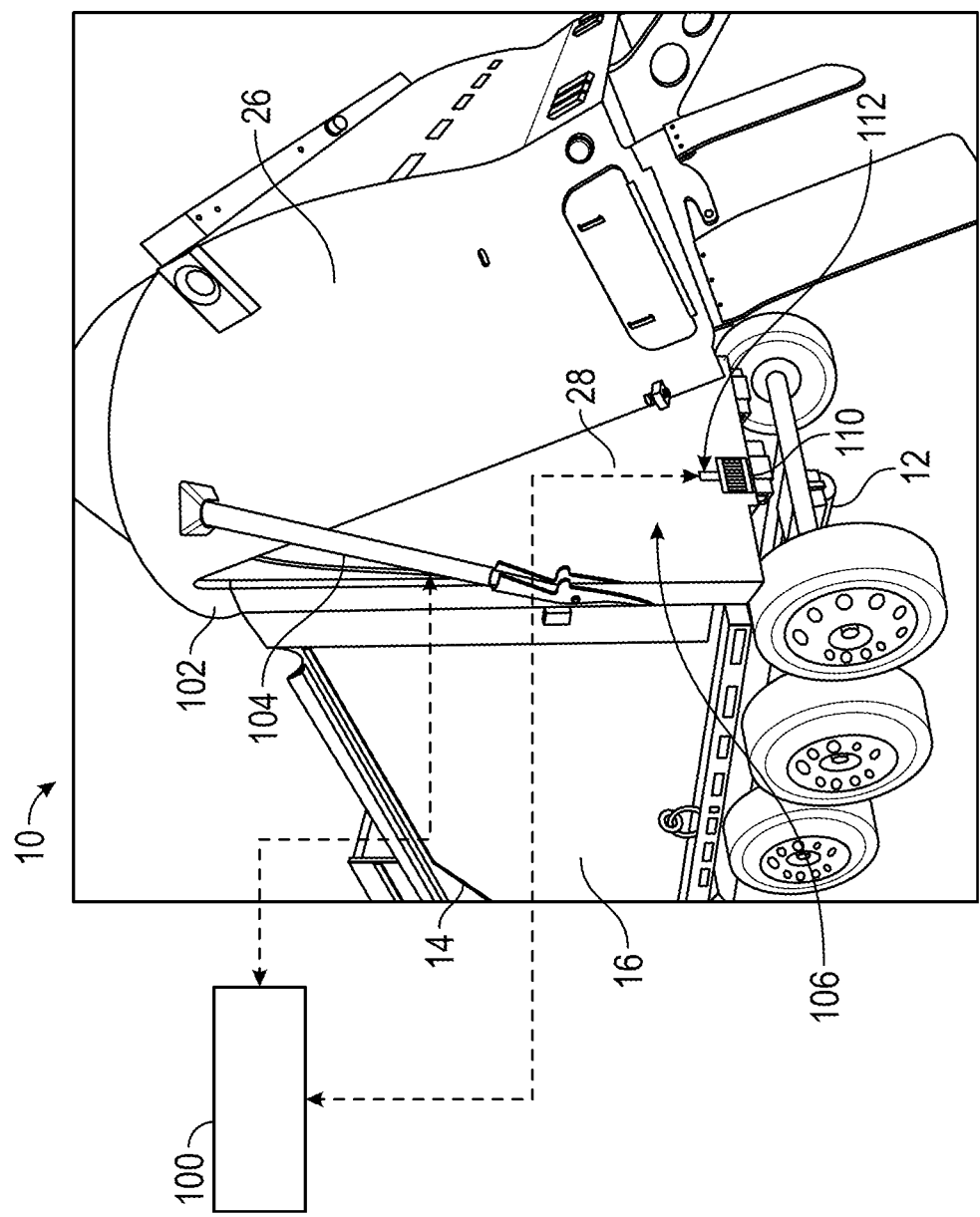
FIG. 7 is a rear perspective view of the refuse vehicle of FIG. 2.

As shown in FIG. 7, the tailgate 26 is shown in additional detail. The tailgate 26 is movably (e.g., rotatably) coupled to the on-board receptacle 16, and is positioned at a rear end of the body 14. The tailgate 26 is movable between a first "closed" position (shown in FIG. 1, for example) and a second or "open" position shown in FIG. 7 about pivot pins 102 positioned along a top surface of the on-board receptacle 16. An actuator 104 (e.g., hydraulic cylinder, linear actuator, etc.) is coupled to each of the on-board receptacle 16 and the tailgate 26. The positioning of the actuator 104 (e.g., the amount of extension) determines the position of the tailgate 26. For example, when the actuator 104 is retracted, the tailgate 26 is urged downward, to the closed position. As the actuator 104 extends, the tailgate 26 is pushed upwardly and outwardly away from the on-board receptacle 16. The tailgate 26 rotates about the pivot pins 102 to create an opening 106 within the rear end of the on-board receptacle 16. With the tailgate 26 in the open position, an ejection stroke can be performed by the ejector assembly 42 to empty the contents of the on-board receptacle stored within the collection chamber 28.

Like the actuator assembly 90, the actuator 104 is also in communication with the processor 100. The processor 100 can monitor a position of the tailgate 26 (e.g., open or closed) and issue commands to adjust the actuator 104 to transition the tailgate 26 between positions. In some examples, the position of the tailgate 26 is controllable from within the cab 18, for example.

In some embodiments, a lock, shown as a lock 110 is positioned between the tailgate 26 and the on-board receptacle 16. The lock 110 may have an unlocked position and a locked position. In some examples, the lock 110 is configured to releasably secure the tailgate 26 to the on-board receptacle 16 in the closed position. The lock 110 can help secure the tailgate 26 in place relative to the on-board receptacle 16 when a compactor stroke is performed by the ejector assembly 42, for example. As the wall 43 and packer 44 approach the tailgate 26 to compact refuse within the collection chamber 28, the tailgate 26 can be subjected to significant horizontal loading. Without the lock 110, the tailgate 26 may be otherwise prone to rotating about the pivot pins 102, and transitioning to the open position. Without the tailgate 26 closing off one end of the collection chamber 28, the wall 43 and packer 44 will eject refuse from the on-board receptacle 16, rather than compacting it.

According to an embodiment, the lock 110 includes an electronic actuator 112 in communication with the processor 100. The electronic actuator 112 can serve as a deadbolt that can transition between an unlocked, or retreated position and a locked, or advanced position. In some examples, the lock 110 includes a manual override option such as, for example, a keyway that can transition the lock between locked and unlocked positions. In some examples, the processor 100 controls the electronic actuator 112 to transition to the locked position whenever the processor 100 detects that the tailgate 26 is in the closed position. In still other examples, the processor 100 controls the electronic actuator 112 to transition to or remain in the locked position whenever the processor 100 detects that the vehicle has eclipsed a threshold speed (e.g., 5 mph).

Figure 8:
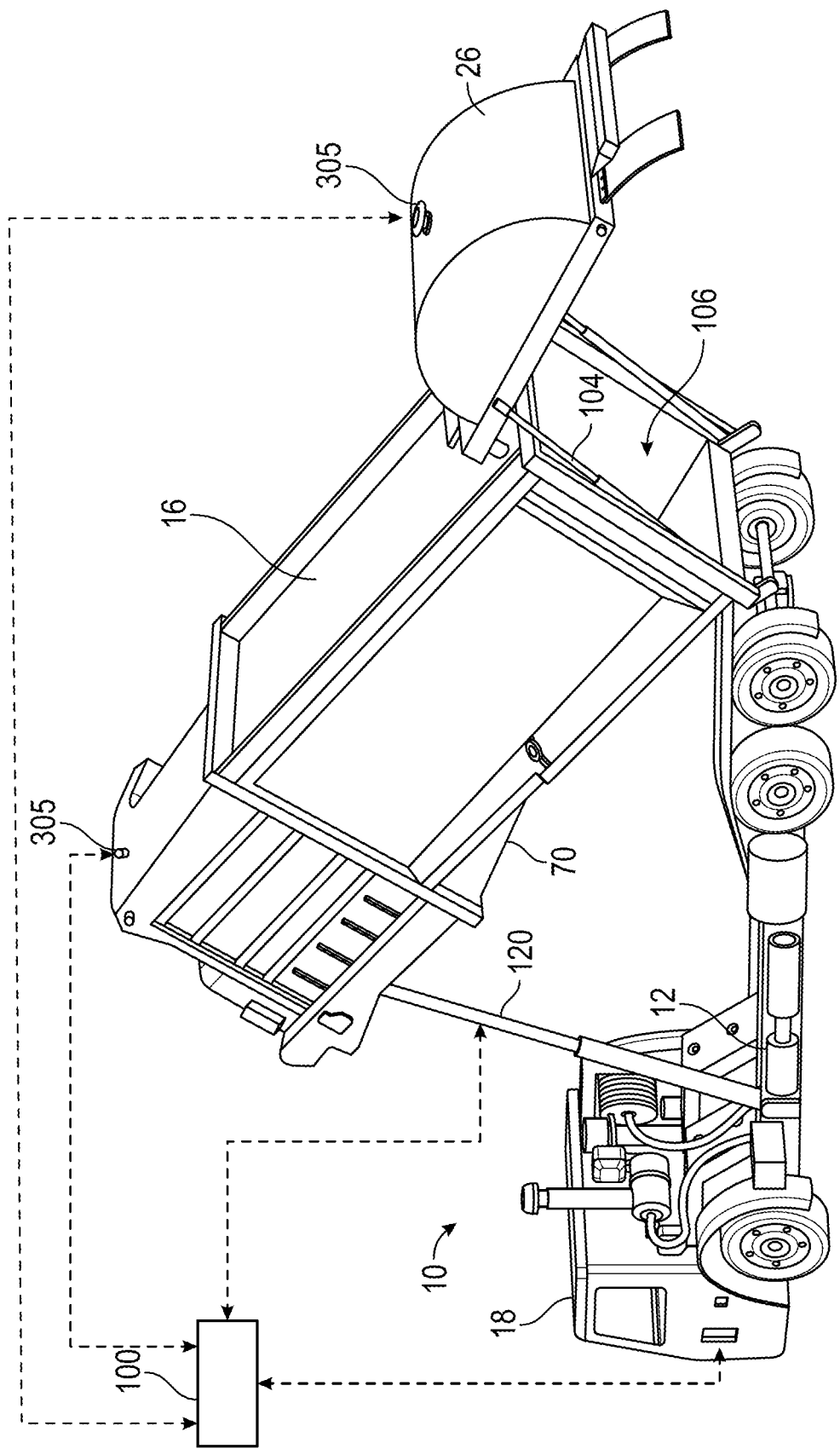
FIG. 8 is a perspective view of the refuse vehicle of FIG. 2 with a portion of the body assembly raised away from a chassis of the refuse vehicle to empty refuse from within the body assembly.

As shown in FIG. 8, the on-board receptacle 16 can be adjusted to empty or otherwise eject refuse stored within the collection chamber 28. An actuator 120 (e.g., a hydraulic cylinder, linear actuator, etc.) can be coupled the frame 12 on one end and coupled to an underside of the on-board receptacle 16 (e.g., to the floor panel 70) on the other end. The actuator 120 can transition between a fully retracted position and an extended position to adjust an angular relationship of the on-board receptacle 16 relative to the frame 12. In the fully retracted position (e.g., shown in FIG. 2), the on-board receptacle 16 can rest upon the frame 12. The floor panel 70 extends approximately parallel to the ground surface below the vehicle 10. As the actuator 120 extends away from the retracted position, upward force is transmitted by the actuator 120 to the floor panel 70 of the on-board receptacle 16. The on-board receptacle 16 is pivotally coupled to a rear end of the frame 12, such that the upward force from the actuator 120 causes the on-board receptacle 16 to rotate about the pivotal coupling. The on-board receptacle 16 continues to rotate as the actuator 120 extends toward a fully deployed position (shown in FIG. 8). In the fully deployed position, the floor panel 70 is positioned at an acute angle relative to the ground surface below. With the tailgate 26 opened, refuse received within the collection chamber 28 can be removed. The ejector assembly 42 can perform an ejection stroke to remove the contents of the collection chamber 28 outward through the opening 106. Angling the on-board receptacle 16 relative to the ground below allows gravity to assist in the waste removal process, and can help drain any fluids or residual liquid from the on-board receptacle 16.

The actuator 120 can also be controlled by the processor 100. The processor 100 can monitor the position of the actuator 120 and can issue commands to the actuator 120 based upon other data received by the processor. For example, the processor 100 may control the actuator 120 to remain in the retracted position whenever the processor 100 detects that the lock 110 is in the locked position and/or the tailgate 26 is closed. In some examples, the processor 100 communicates with a throttle and/or clutch of a vehicle transmission so that the actuator 120 cannot be deployed or otherwise adjusted outward from the fully-retracted position when the processor 100 receives an indication that the vehicle 10 is traveling over a threshold speed (e.g., 10 mph). In another example, the processor 100 may also receive signals from the sensors 304 (e.g., proximity sensors, cameras, etc.), shown as sensor 305, that indicate an unsafe condition for moving the on-board receptacle 16 towards the fully deployed position. In this example, the processor 100 may prevent adjustment of actuator 120 outward from the fully-retracted position.

Figure 12:
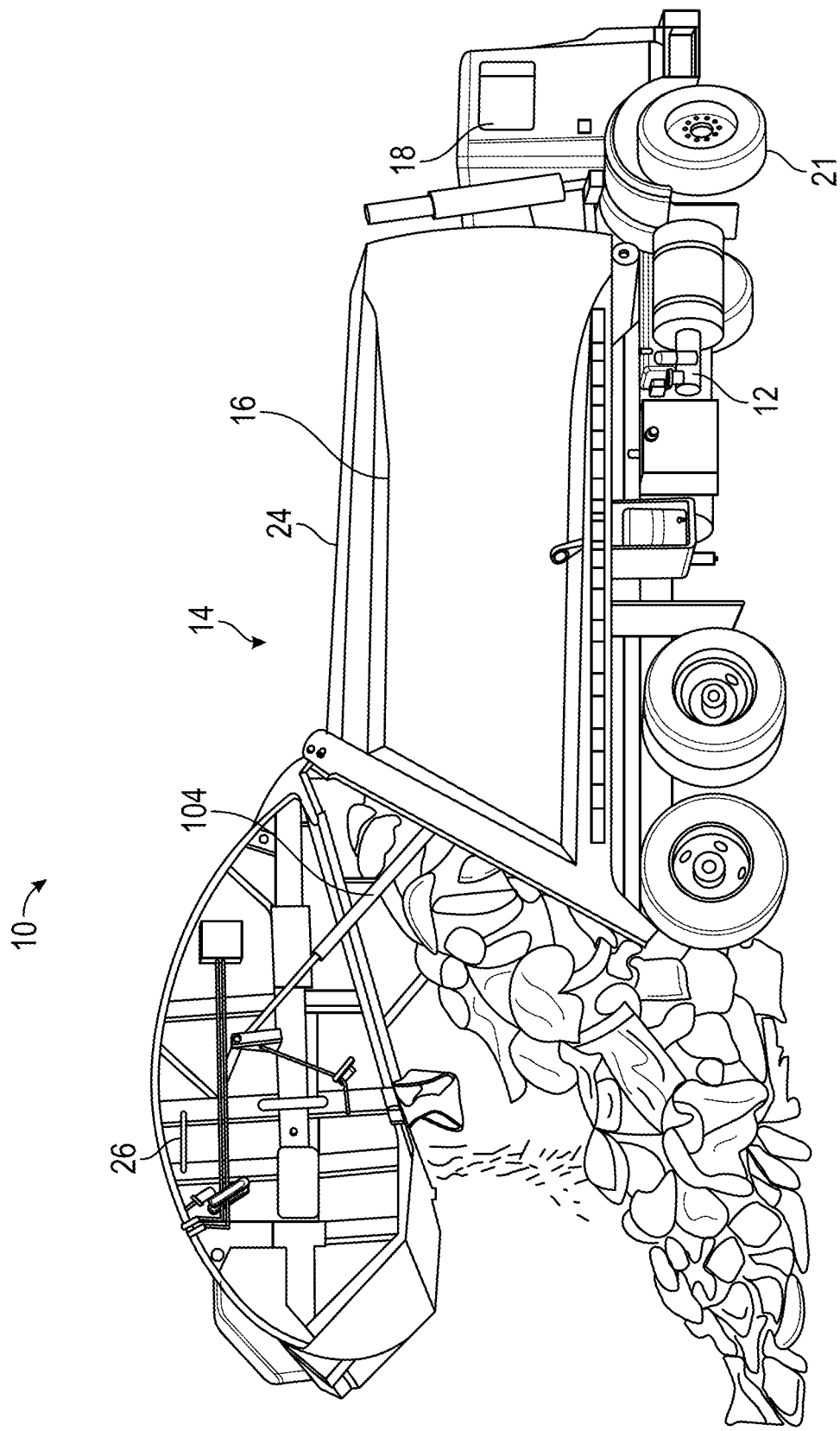
FIG. 12 is another rear perspective view of the rear loading refuse vehicle of FIG. 11, shown ejecting refuse from within the body assembly.

Alternatively, and as depicted in FIGS. 11-12, the actuator assembly 90 and ejector assembly 42 can be used to eject and empty refuse stored within the collection chamber 28 of the on-board receptacle 16. When the actuator assembly 90 extends, the ejector assembly 42 begins to perform an ejection stroke. To aid in the ejection process for rear loading refuse vehicles, the packer 44 can be angled (e.g., forming an obtuse angle relative to the floor panel 70) to aid in the refuse removal process. The packer 44 angles downwardly and rearwardly away from the front of the refuse vehicle 10. When the actuator assembly 90 is fully extended during the ejection stroke, the packer 44 can extend approximately coplanar with a rear lip 94 of the on-board receptacle 16. Accordingly, the packer 44 and rear lip 94 provide a continuous or near-continuous slide-like surface that directs refuse within the on-board receptacle 16 downward and outward from the collection chamber 28. Aided by the force of gravity, refuse will naturally fall outward from the collection chamber 28.

Like the actuator 120, the actuator assembly 90 can also be controlled by the processor 100. The processor 100 can monitor the position of the actuator assembly 90 and can issue commands to the actuator assembly 90 based upon other data received by the processor 100. For example, the processor 100 may control the actuator assembly 90 to perform only a compaction stroke (e.g., a reduced stroke length compared to the ejection stroke) whenever the processor 100 detects that the lock 110 is in the locked position and/or the tailgate 26 is closed. In some examples, the processor 100 communicates with a throttle and/or clutch of a vehicle transmission so that the actuator assembly 90 cannot execute a full ejection stroke when the processor 100 receives an indication that the vehicle 10 is traveling over a threshold speed (e.g., 10 mph). In other embodiments, the processor 100 communicates with the throttle and/or clutch of the vehicle transmission so that when the actuator assembly 90 begins performing an ejection stroke, the vehicle 10 is placed in gear and begins to travel forward at a predetermined travel speed (e.g., 2 mph) until the actuator assembly 90 is fully deployed (as shown in FIG. 11). As shown in FIG. 1 and FIG. 2, sensors 304, shown as sensor 305, may be positioned on the vehicle 10 (e.g., in front) such that they detect obstructions or unsafe operating conditions during partially or fully automated operations of the vehicle. For example, when the vehicle is placed in gear and begins to travel at a predetermined speed controlled by the processor 100, as disclosed in several embodiments, the sensors 304 may provide an indication of an unsafe operating condition to processor 100 that causes the processor 100 to issue a command that prevents, aborts, and/or halts movement of the vehicle or the vehicles subsystems 302, and/or withhold additional commands that would otherwise lead to partially or fully automated movement of the vehicle.

Figure 9:
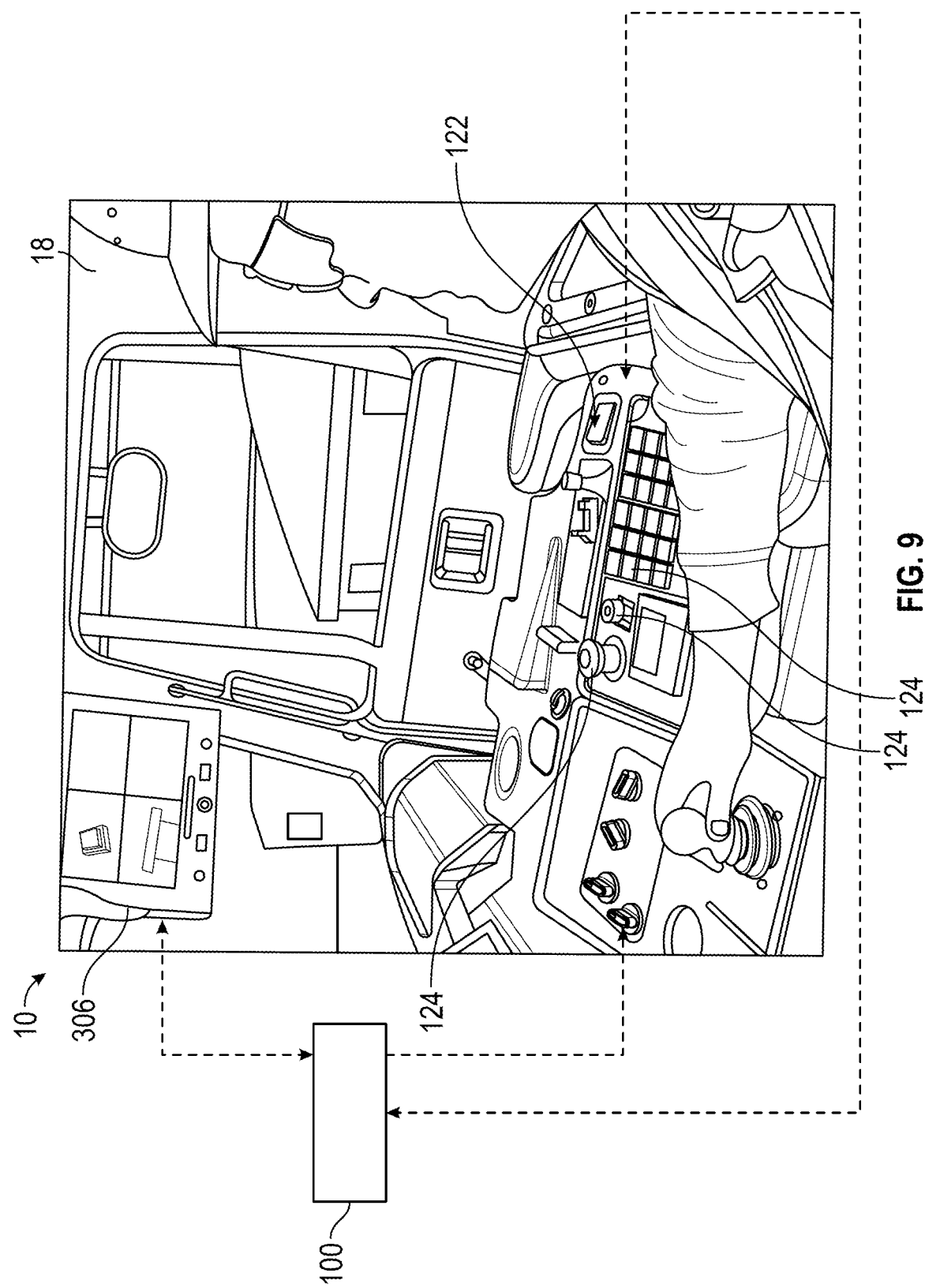
FIG. 9 is a pictorial view of a cab within the side loading refuse vehicle of FIG. 2.

As shown in FIG. 9, each of the actuator assembly 90, actuator 104, electronic actuator 112, and actuator 120 can be controlled from within a central location, such as the cab 18 of the refuse vehicle 10, depicted in FIG. 9. The cab 18 includes a control panel 122 including a series of inputs 124 that can be actuated by a user to perform different operations. The control panel 122 and inputs 124 can also be in communication with the processor 100 to provide signals or commands that can be subsequently executed by the processor 100. By having each of the actuator assembly 90, actuator 104, electronic actuator 112, and actuator 120 centrally controlled by the processor 100, various different processes can be performed automatically or with significantly reduced user interaction that might otherwise introduce error, safety concerns, or delay into vehicle operation.

Figure 13:
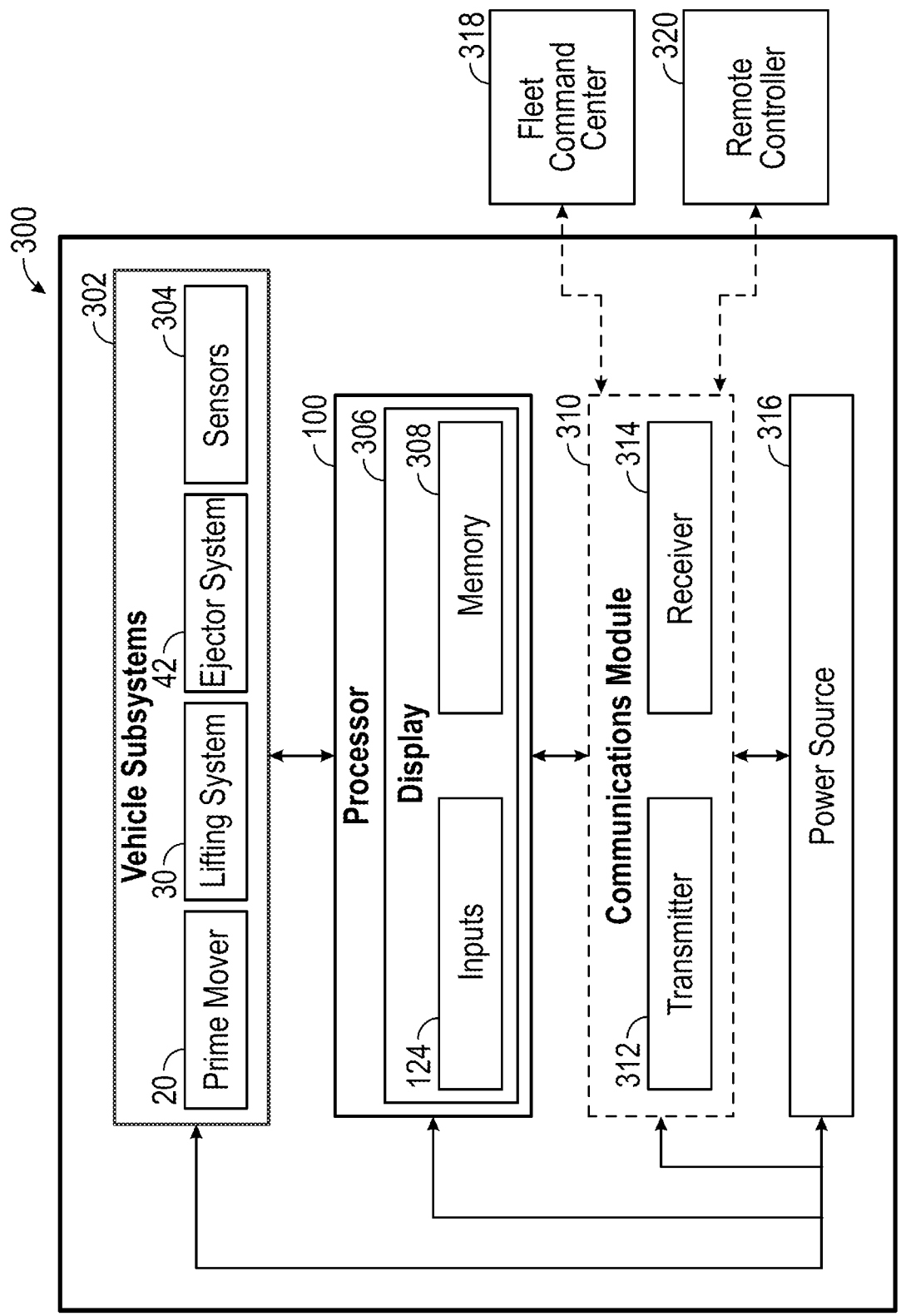
FIG. 13 is a schematic diagram of components that can be incorporated into a refuse vehicle, according to an exemplary embodiment.

As shown in FIG. 13, the control system 300 is shown to include the processor 100, vehicle subsystems 302, a display 306, a communications module 310 and a power source 316, according to some embodiments. The control system 300 can provide operating instructions to various vehicle subsystems 302, including a steering system, the prime mover 20, lifting system 30, ejector assembly 42 (shown in FIG. 3) present within the on-board receptacle 16, cab climate controls, and/or other adjustable systems aboard the refuse vehicle 10. The processor 100 can issue instructions or commands to each system within the vehicle 10 to execute desired vehicle functions. Each subsystem 302 may be at least partially powered by the power source 316 and operated by the inputs 124, which may include a steering wheel, throttle, joystick, buttons or the like. The control system 300 can be organized as shown in FIG. 13. An on-board power source 316 (e.g., a battery) can provide electrical power to each of the components within the control system 300. The processor 100 can be coupled to the display 306 to present a graphical user interface (GUI). Inputs 124 may be in communication with the display 306 and processor 100 can be used to interact with the GUI. Memory can be stored on-board the vehicle 10 or remotely, but is in communication with and accessible by the processor 100.

An operator can interact with the control system 300 through a display 306 in communication with the processor 100. The display 306 can present a GUI that allows a user to monitor operational parameters of the vehicle 10 as well as input commands to the various vehicle subsystems 302. In a non-limiting example, the display 306 may be used to monitor sensors 304 and/or cameras located at various locations on the vehicle and/or status of commands issued by the remote controller 320, fleet command center 318, and/or inputs 124 received by processor 100. The display 306 may be a touch screen display or can be accompanied by a plurality of inputs 124, that can be used to toggle through and select a desired input 124 on the GUI.

In some embodiments, the control system 300 includes a communications module 310 to send and receive data from an external source (e.g., external device, remote device, a fleet command center 318, remote controller 320, network, etc.). For example, the communications module 310 may include a transmitter 312 that can communicate with an external source, shown as a fleet command center 318, remote controller 320, or a network to send data related to the vehicle's performance. The communications module 310 can further include a receiver 314 that can communicate with an external computer, network, or external device to receive instructions, data, updated processor software, performance parameters, and other data that may advantageously be used to operate the refuse vehicle 10. Using the communications module 310, a refuse vehicle can be remotely controlled or monitored to ensure optimized performance and efficiency is occurring. In a non-limiting example, the remote controller 320 may interface with communications module 310 through a wired or wireless means (e.g., direct wired connection, infrared connection, radio frequency connection, satellite connection, cellular internet connection).

The processor 100 may be in communication with a location aware device such as a global positioning system (GPS). The GPS, which can be included as the sensors 304 of the vehicle subsystems 302, monitors the location of the refuse vehicle 10 as the vehicle travels. The monitored location may be stored in a local or remote memory 308 and/or transmitted through communications module 310 to a fleet command center 318, remote controller 320, and/or a position monitoring service. The memory 308 can store a variety of different geographical indicators, such as "checkpoints" or geo-fences (e.g., geo-fence 502), which can be periodically compared with the current location of the refuse vehicle 10.

According to the exemplary embodiment shown in FIG. 15, the entrance to or perimeter of a location (e.g., refuse management location) may include a corresponding geo-fence, checkpoint or a combination of geo-fences and checkpoints, shown as geo-fence 502. The use of geographical indicators at locations creates geographically indicated locations, shown as geographically indicated location 500. If the refuse vehicle 10 crosses a geo-fence stored in memory 308 or reaches a checkpoint, for example, the processor 100 can transition the refuse vehicle 10 into a different operational mode, such as a remote control operational mode. According to an exemplary embodiment, upon the refuse vehicle 10 entering geographically indicated location, the refuse vehicle 10 may activate a partially or fully automated sequence (e.g., a dumping sequence). The geo-fences and checkpoints stored in memory 308 may be periodically updated and/or modified through software updates or data received from an external device or network. Different operational modes (e.g., remote control) may be selected by processor 100 based on sensed position data, a command from a remote controller 320, and/or a fleet command center 318.

The location aware device may use other systems to determine the vehicle's location. For example, a secondary positioning system may be used by the location aware device in instances where the primary positioning system (e.g., GPS) is inaccurate (e.g., operation within an indoor storage facility). In this example, the location aware device may include a second positioning system involving emitters located at stationary positions within the facility and/or geo-fenced area that are used to determine the relative location of the vehicle 10. The location aware device can use any combination of sensors such as cameras, infrared sensors, photoelectric sensors, and/or ultrasonic sensors, to determine a relative position to the stationary emitters within the facility. In some embodiments, the display 306 may indicate the position of the vehicle 10 relative to geo-fenced locations and/or check-points stored in the memory 308.

Figure 10:
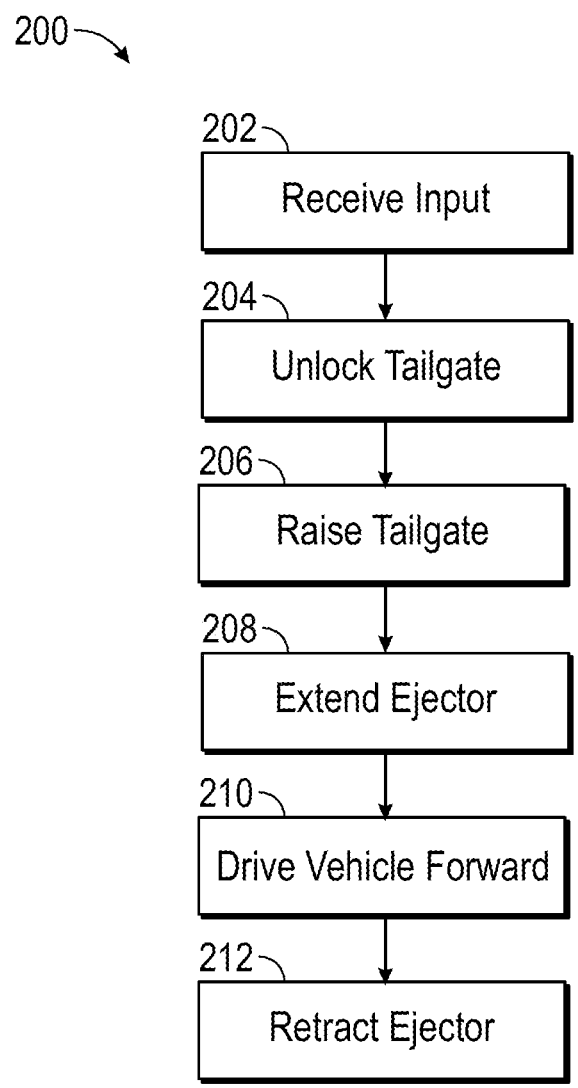
FIG. 10 is a process diagram depicting a method of operating a refuse vehicle according to an exemplary embodiment.

As shown in FIG. 10, a method of controlling a refuse vehicle and, more specifically, a method 200 of executing an ejection cycle (e.g., a dumping cycle, ejection sequence, dumping sequence, etc.) with a refuse vehicle is depicted. The refuse vehicle, may be refuse vehicle 10 described above with respect to FIGS. 1, 2, 11, 12, for example. According to an exemplary embodiment, the refuse vehicle includes a central processing unit (e.g., processor 100), in communication with various subsystems 302 throughout the refuse vehicle 10.

At block 202, the processor 100 receives an input. The input can be provided in a variety of different methods, including via actuation of one of the inputs 124 on the control panel 122 or display 306 within the cab 18 by an operator, or automatically initiated by the on-board processor in response to detected and received data. For example, one of the inputs 124 can be configured as an "initiate dump sequence" button which would initiate the dumping sequence. Alternatively, the input can be generated by the processor 100 itself, based upon detected or received data. For example, if the processor 100 receives an indication from an on-board location aware device such as a global positioning system (GPS) within the control panel 122 that the refuse vehicle is currently within a known or mapped refuse dumping or storage location (e.g., a landfill, recycling center, etc.), the processor 100 can continue to monitor the refuse vehicle 10 and/or generate the input to begin an automated sequence. If the refuse vehicle 10 is parked or otherwise stopped for a specified time threshold (e.g., 30 seconds), the processor 100 may generate the input to initiate the ejection sequence or wait to receive commands (e.g., the input) from a fleet command center 318 or remote controller 320. In an exemplary embodiment, the processor 100 uses a single input (e.g., the input) to begin a partially or fully automated sequence (e.g., a dumping sequence, ejection sequence, etc.).

Once the input has been received by the processor 100, the processor 100 communicates with subsystems within the refuse vehicle 10 to automatically execute the dumping sequence. In some embodiments, the processor 100 may receive the input (e.g., the single input) and continuously or discontinuously compare the value of sensors 304 to predetermined values. For example, the processor 100 may receive an input 124 and compare the value of the sensors 304 to values which indicate the absence of an obstacle in the sensed direction before activating a subsequent block. The dumping sequence begins at block 204, where the tailgate 26 is unlocked. The processor 100 issues a command to the electronic actuator 112 of the lock 110 to transition from the locked position to the unlocked position. The electronic actuator 112 retracts into the lock 110 and disengages the tailgate 26.

Once the lock 110 has been unlocked and the processor receives an indication from the lock (e.g., a position indication of the electronic actuator 112), the processor 100 activates the actuator 104 to raise and open the tailgate at block 206. As the actuator 104 extends, the tailgate 26 rotates about the pivot pins 102 upwardly and outwardly away from the on-board receptacle 16, as depicted in each of FIGS. 7-8 and 11-12. Once the actuator 104 reaches full extension, the tailgate 26 is in the open position and the opening 106 within the on-board receptacle 16 is established.

Once the processor 100 has received confirmation (e.g., an indication) that the tailgate 26 has reached its fully open position (e.g., from a position sensor within the actuator 104), the processor 100 activates the ejector assembly 42 at block 208 to initiate an ejection stroke. The actuator assembly 90 can transition the packer 44 to the closed position 46 and then urge the packer 44 and wall 43 along the rails 80, rearward toward the opening 106 within the on-board receptacle 16 to push refuse within the collection chamber 28 outward through the opening 106. The angled surface created by the wall 43 and packer 44 pushes refuse outward from the collection chamber 28, through the opening 106, and onto the ground surface below the vehicle.

As shown in FIGS. 1, 2 and 8, the actuator 120 is configured to further aid in the refuse removable process. Prior to extending the ejector at block 208, the processor 100 can control the actuator 120 to extend to raise the front end of the on-board receptacle 16. As the actuator 120 extends away from its stowed and retracted position, force is applied to the underside of the on-board receptacle 16. As explained with respect to FIG. 8, the on-board receptacle 16 is rotatably coupled to the rear end of the frame 12, such that the vertical component of force supplied the underside of the on-board receptacle 16 by the actuator 120 rotates the on-board receptacle 16. As the actuator 120 extends, the on-board receptacle 16 continues to move away from its stowed, resting position approximately parallel to the ground below toward a second position angularly offset from the first position. In the second position, the front end of the on-board receptacle 16 is elevated above the rear end, such that an acute angle (e.g., between about 30 and 60 degrees) is formed between the on-board receptacle 16 and the ground below. With the front end of the on-board receptacle 16 raised and the tailgate 26 open, gravity will cause refuse within the collection chamber 28 to fall downward and outward from the on-board receptacle 16 to the ground below.

As the ejection stroke is being performed (and in some examples, the on-board receptacle 16 is raised), the processor 100 can control the throttle and/or clutch and brake to drive the refuse vehicle 10 forward at block 210. To properly empty the collection chamber 28 of the on-board receptacle 16, the refuse vehicle 10 advantageously moves forward slowly as waste falls out of the collection chamber 28 through the opening 106. If the vehicle 10 remains stationary, refuse from the collection chamber 28 may stack up and prevent the removal of all waste present within the on-board receptacle 16. By controlling the vehicle 10 to drive slowly forward (e.g., less than 5 mph), waste can be ejected through the opening 106 in a controlled, orderly, and efficient manner. Once the ejector assembly 42 has reached its full stroke length (e.g., the packer 44 and wall 43 are positioned proximate the opening 106), the processor 100 can once again control and/or stop the vehicle 10 from moving by disengaging the clutch or engaging a parking brake, for example, so that an operator can resume control of the vehicle 10.

The processor 100 can control the ejector assembly 42 to return to its retracted position near the front of the on-board receptacle at block 212. Finally, once the processor 100 verifies that the ejection stroke has been completed by the ejector assembly 42 and packer 44 and wall 43 have returned to a retracted position, the processor 100 can issue a command to the actuator 120 to lower the on-board receptacle 16 (if necessary or present). In some examples, the actuator 120 and the ejector assembly 42 can retract simultaneously at block 212. The actuator 120 can retract to lower the front end of the on-board receptacle toward the frame 12. Once the actuator has 120 indicates to the processor 100 that the fully-retracted position has been reached and the on-board receptacle has returned to the rest position, the processor can initiate a command to the actuator 104 to retract and lower the tailgate 26 back to the closed position. Once returned to the closed position, the processor 100 automatically initiates the lock 110 to engage the tailgate 26 by extending the electronic actuator 112. In some examples, the processor 100 automatically controls the actuator 104 to lower the tailgate to the closed position whenever a threshold speed is crossed (e.g., 10 mph), for example.

In some embodiments, the processor 100 may receive the input 124 and continuously or discontinuously compare sensor values to predetermined values. For example, the processor 100 may receive an input 124 and compare the value of the sensors 304 to values known to indicate the absence of an obstacle (e.g., other refuse vehicles, human operators, trees, power lines, buildings, etc.) in the sensed direction before activating block 204. In an embodiment, the processor 100 may compare the measured value of a sensor or plurality of sensors 304 (e.g. proximity sensors) located on the front of the vehicle oriented in the direction of travel to a predetermined value. The predetermined value may be the value known to indicate the absence of an obstacle within the detectable range of sensors 304, or the value that indicates the absence of an obstacle within the range of the anticipated movement (e.g. the movement associated with driving the vehicle 10 forward corresponding to block 210). For example, a sensor, shown as sensor 305 may have a detectable range of 15 meters, and the movement associated with block 210 may be 10 meters. The processor may abort the sequence when the measured value is undesirable relative to the predetermined value associated with an object (e.g., obstacle) located 10 meters away. The processor 100 may abort the dumping sequence before executing block 204, or at any point in sequence to prevent collision with an obstacle. For example, if a sensor 305 detects an obstacle in the direction of movement associated with blocks 204, 206, 208, 210, and/or 212, the processor may prevent or halt the movement associated with the execution of blocks 204, 206, 208, 210, and/or 212 to prevent an undesirable proximity to the detected obstacle (e.g., collision). According to an exemplary embodiment, the processor 100 may continuously or discontinuously monitor values of sensors 304 and compare the values with predetermined threshold values. In an embodiment, a notification of an aborted cycle and/or the measured or sensed value causing the processor 100 to abort the sequence may appear on the display 306 and/or be sent through the communications module 310 to a fleet command center 318 or remote controller 320.

According to some embodiments, for example the exemplary embodiments in FIGS. 1, 2, and 8, the vehicle may employ a variety of sensors 304, shown as sensor 305, in communication with the processor 100. The sensors 304 may be used for monitoring actuator positions and forces applied, monitoring the vehicle's locations and positions, and/or monitoring the vehicle's surrounding environment. The sensors 304 (e.g., proximity sensors, cameras, etc.) may be located on the external or internal surfaces of the vehicle 10 such that they monitor a surrounding environment during operation to aid the operator or remote operator with safely activing a fully or partially automated movement of the vehicle 10. For example, proximity sensors (e.g., sensor 305) may be located on the vehicle towards the front and rear of the vehicle 10 oriented in the direction of travel, as shown in at least FIGS. 1 and 2. During operation of the partially or fully automated ejection cycle (e.g., ejection sequence, dumping sequence), the vehicle may move in several directions with or without operator input. The sensors 304 may be used to determine if the direction of travel is free of obstacles and/or hazards. Having at least one sensor in at least one of the directions of partially or fully automated movement may prevent damage to the refuse vehicle 10 or obstacles in the surrounding environment.

Figure 14:
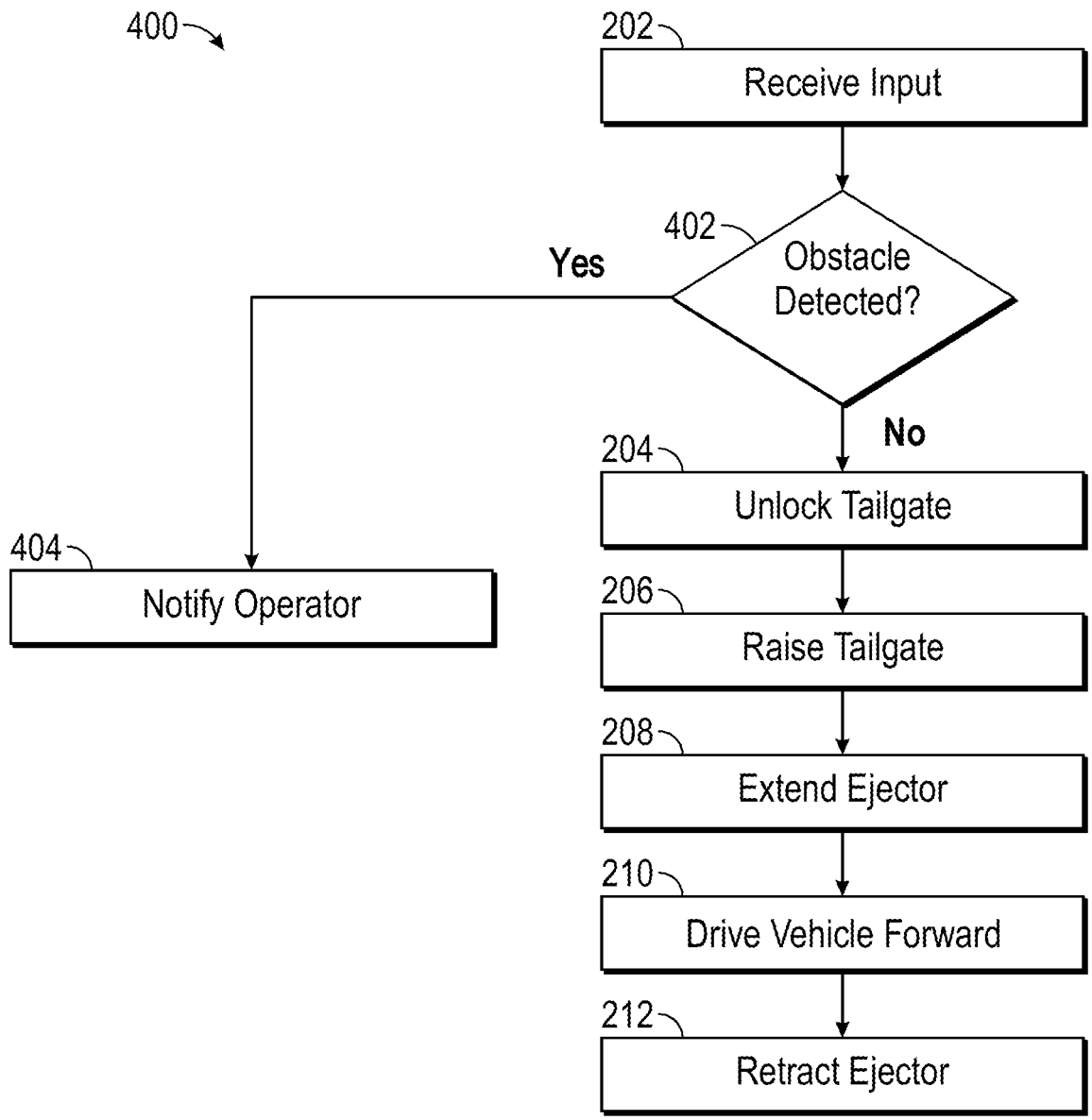
FIG. 14 is a process diagram depicting a method of operating a refuse vehicle according to an exemplary embodiment.

As shown in FIG. 14, an alternative form of the method 200 for controlling a refuse vehicle ejection cycle is shown as method 400. According to an exemplary embodiment, the method includes a comparison step, shown as obstacle detected block 402, which compares sensor values (e.g., sensors 304) to predetermined values. The predetermined values may be the predetermined values discussed in detail previously. Block 402 compares the sensor values to predetermined values to determine if an obstacle 600 is detected. If an obstacle is detected, the processor may notify the operator, as shown by notify operator block 404. If an obstacle is not detected, the processor can activate blocks 204, 206, 208, 210, and 212, as discussed previously. In some embodiments, block 402 may be inserted between blocks 204, 206, 208, 210 and/or 212.

Figure 16:
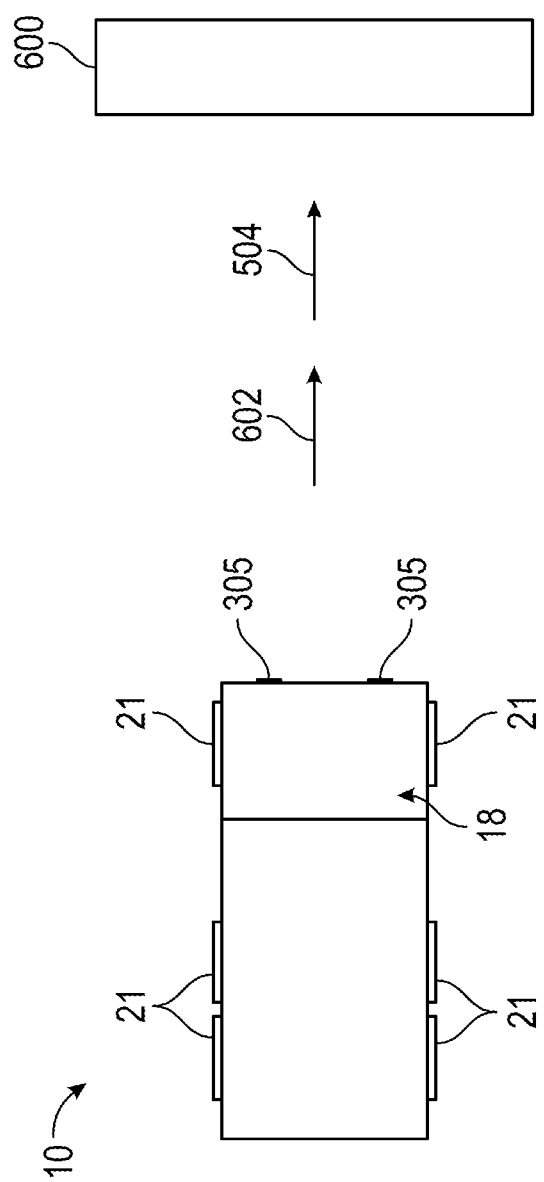
FIG. 16 is a top view of a refuse vehicle in operation, according to an exemplary embodiment.

As shown in the exemplary embodiment in FIG. 16, a refuse vehicle 10 is shown to travel in the direction 504. The refuse vehicle 10 may have sensors, shown as sensor 305, positioned to detect an obstacle 600. For example, the sensor 305 may be oriented to detect obstacles in the direction 602. As shown in FIG. 16, the sensor 305 is configured to detect obstacles in direction 602, which is in the same direction as direction 504. In some embodiments, sensor 305 may be configured and positioned to detect obstacles in other directions (e.g., as shown in FIG. 8).

Conventional dumping processes may be time consuming and prone to errors. Incorporating the processor and methods described herein advantageously create a partially or fully automated dumping cycle that can be executed in a much faster, safer, and efficient manner. Advantageously, operators do not need to leave the cab of the vehicle to unlock or otherwise manipulate components that can introduce errors and inefficiencies that can be costly over time. By providing only a single input (e.g., a button within the control panel 122, automatically generated input upon entering a geographically indicated location, or a remote communication) an error-free and efficient dumping process can be executed.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various processing steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "lowermost," "uppermost," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, comprising:
   a chassis;
   a body supported by the chassis and defining a receptacle configured to store refuse therein, the receptacle having a first end and an opposing second end;
   a lock coupled to the body, wherein the lock is selectively repositionable between a locked position and an unlocked position;
   a tailgate positioned at the second end of the receptacle, wherein the tailgate is pivotally coupled to the body and selectively repositionable between an open position and a closed position, wherein the tailgate is configured to be releasably secured in the closed position by the lock;
   an ejector positioned within the receptacle, wherein the ejector is slidable within the receptacle between a first position that is spaced from the tailgate and a second position proximate the tailgate, wherein the ejector is a compactor, and wherein the ejector is at least partially defined by a packer extending obliquely to a floor of the receptacle;
   an actuator coupled to the body and the ejector, the actuator configured to transition the ejector between the first position and the second position;
   a second actuator coupled to the tailgate and the body and configured to transition the tailgate from the closed position to the open position; and
   a processor configured to:
      provide command signals to (a) selectively reconfigure the lock into the unlocked position to unlock the tailgate and (b) transition the ejector from the first position to the second position both in response to receiving a single input to thereby eject refuse from the receptacle without receiving multiple input commands;
      provide command signals to the second actuator to transition the tailgate from the closed position to the open position in response to receiving the single input; and
      provide command signals to drive the refuse vehicle forward when the ejector is transitioning from the first position to the second position in response to the single input.

2. The refuse vehicle of claim 1, further comprising a lifting system proximate the body and movable relative to the receptacle.

3. The refuse vehicle of claim 1, wherein the processor is configured to receive the single input from a remote device.

4. A refuse vehicle, comprising:
   a chassis;
   a body supported by the chassis and defining a receptacle configured to store refuse therein, the receptacle having a first end and an opposing second end;
   a lock coupled to the body, wherein the lock is selectively repositionable between a locked position and an unlocked position;
   a tailgate positioned at the second end of the receptacle, wherein the tailgate is pivotally coupled to the body and selectively repositionable between an open position and a closed position, wherein the tailgate is configured to be releasably secured in the closed position by the lock;
   an ejector positioned within the receptacle, wherein the ejector is slidable within the receptacle between a first position that is spaced from the tailgate and a second position proximate the tailgate;
   an actuator coupled to the body and the ejector, the actuator configured to transition the ejector between the first position and the second position;
   a second actuator coupled to the tailgate and the body and configured to transition the tailgate from the closed position to the open position;
   a sensor, wherein the sensor is configured to detect an obstacle;
   a processor configured to:
      provide command signals to (a) selectively reconfigure the lock into the unlocked position to unlock the tailgate and (b) transition the ejector from the first position to the second position both in response to receiving a single input to thereby eject refuse from the receptacle without receiving multiple input commands;
      provide command signals to the second actuator to transition the tailgate from the closed position to the open position in response to receiving the single input;
      receive the single input from a remote device, and compare a value of the sensor to a predetermined value.

5. The refuse vehicle of claim 4, further comprising a lifting system proximate the body and movable relative to the receptacle.

6. The refuse vehicle of claim 4, wherein the processor is configured to provide command signals to drive the refuse vehicle forward when the ejector is transitioning from the first position to the second position in response to the single input.

7. A refuse vehicle, comprising:
   a chassis;
   a body supported by the chassis and defining a receptacle configured to store refuse therein, the receptacle having a first end and an opposing second end;
   a lock coupled to the body, wherein the lock is selectively repositionable between a locked position and an unlocked position;
   a tailgate positioned at the second end of the receptacle, wherein the tailgate is pivotally coupled to the body and selectively repositionable between an open position and a closed position, wherein the tailgate is configured to be releasably secured in the closed position by the lock;
   an ejector positioned within the receptacle, wherein the ejector is slidable within the receptacle between a first position that is spaced from the tailgate and a second position proximate the tailgate;
   an actuator coupled to the body and the ejector, the actuator configured to transition the ejector between the first position and the second position;
   a second actuator coupled to the tailgate and the body and configured to transition the tailgate from the closed position to the open position;
   a processor configured to:
     provide command signals to (a) selectively reconfigure the lock into the unlocked position to unlock the tailgate and (b) transition the ejector from the first position to the second position both in response to receiving a single input to thereby eject refuse from the receptacle without receiving multiple input commands;
     provide command signals to the second actuator to transition the tailgate from the closed position to the open position in response to receiving the single input; and
     automatically receive the single input upon the refuse vehicle entering a geographically indicated location.

8. The refuse vehicle of claim 7, further comprising a lifting system proximate the body and movable relative to the receptacle.

9. The refuse vehicle of claim 7, further comprising a sensor, wherein the sensor is configured to detect an obstacle, and wherein the processor compares a value of the sensor to a predetermined value.

10. The refuse vehicle of claim 7, wherein the processor is configured to provide command signals to drive the refuse vehicle forward when the ejector is transitioning from the first position to the second position in response to the single input.

11. A refuse vehicle, comprising:
    a chassis;
    a body supported by the chassis and defining a receptacle configured to store refuse therein, the receptacle having a first end and an opposing second end;
    a lock coupled to the body, wherein the lock is selectively repositionable between a locked position and an unlocked position;
    a tailgate positioned at the second end of the receptacle, wherein the tailgate is pivotally coupled to the body and selectively repositionable between an open position and a closed position, wherein the tailgate is configured to be releasably secured in the closed position by the lock;
    an ejector positioned within the receptacle, wherein the ejector is slidable within the receptacle between a first position that is spaced from the tailgate and a second position proximate the tailgate;
    an actuator coupled to the body and the ejector, the actuator configured to transition the ejector between the first position and the second position; and
    a second actuator coupled to the tailgate and the body and configured to transition the tailgate from the closed position to the open position;
    a processor configured to:
      provide command signals to (a) selectively reconfigure the lock into the unlocked position to unlock the tailgate and (b) transition the ejector from the first position to the second position both in response to receiving a single input to thereby eject refuse from the receptacle without receiving multiple input commands;
      provide command signals to the second actuator to transition the tailgate from the closed position to the open position in response to receiving the single input; and
      provide command signals to the actuator to fully extend the actuator only when the processor receives an indication from a first sensor that the lock is in the unlocked position and a second indication from a second sensor that the tailgate is in the open position.

12. The refuse vehicle of claim 11, further comprising a lifting system proximate the body and movable relative to the receptacle.

13. The refuse vehicle of claim 11, further comprising a third sensor, wherein the third sensor is configured to detect an obstacle, and wherein the processor compares a value of the third sensor to a predetermined value.

14. A refuse vehicle, comprising:
    a chassis;
    a body supported by the chassis and defining a receptacle configured to store refuse therein, the receptacle having a first end and an opposing second end, the receptacle pivotally coupled to the chassis and selectively movable between a first position and a second position, and wherein the second position is angularly offset from the first position;
    a lock coupled to the body, wherein the lock is selectively repositionable between a locked position and an unlocked position;
    a tailgate positioned at the second end of the receptacle, wherein the tailgate is pivotally coupled to the body and selectively repositionable between an open position and a closed position, wherein the tailgate is configured to be releasably secured in the closed position by the lock;
    an ejector positioned within the receptacle, wherein the ejector is slidable within the receptacle between a third position that is spaced from the tailgate and a fourth position proximate the tailgate;
    an actuator coupled to the body and the ejector, the actuator configured to transition the ejector between the third position and the fourth position; and a second actuator coupled to the chassis, wherein the second actuator is selectively movable to transition the receptacle between the first position and the second position;
a sensor, wherein the sensor is configured to detect an obstacle;
a processor configured to:
provide command signals to (a) selectively reconfigure the lock into the unlocked position to unlock the tailgate and (b) transition the ejector from the third position to the fourth position both in response to receiving a single input to thereby eject refuse from the receptacle without receiving multiple input commands;
receive the single input from a remote device, and compare a value of the sensor to a predetermined value.

15. The refuse vehicle of claim 14, wherein the processor is configured to provide command signals to drive the refuse vehicle forward when the ejector is transitioning from the third position to the fourth position in response to the single input.

16. A refuse vehicle, comprising:
a chassis;
a body supported by the chassis and defining a receptacle configured to store refuse therein, the receptacle having a first end and an opposing second end, the receptacle pivotally coupled to the chassis and selectively movable between a first position and a second position, and wherein the second position is angularly offset from the first position;
a lock coupled to the body, wherein the lock is selectively repositionable between a locked position and an unlocked position;
a tailgate positioned at the second end of the receptacle, wherein the tailgate is pivotally coupled to the body and selectively repositionable between an open position and a closed position, wherein the tailgate is configured to be releasably secured in the closed position by the lock;
an ejector positioned within the receptacle, wherein the ejector is slidable within the receptacle between a third position that is spaced from the tailgate and a fourth position proximate the tailgate, and wherein the ejector is a compactor, and wherein the ejector is at least partially defined by a packer extending obliquely to a floor of the receptacle;
an actuator coupled to the body and the ejector, the actuator configured to transition the ejector between the third position and the fourth position; and
a second actuator coupled to the chassis, wherein the second actuator is selectively movable to transition the receptacle between the first position and the second position;
a processor configured to:
provide command signals to (a) selectively reconfigure the lock into the unlocked position to unlock the tailgate and (b) transition the ejector from the third position to the fourth position both in response to receiving a single input to thereby eject refuse from the receptacle without receiving multiple input commands; and
provide command signals to drive the refuse vehicle forward when the ejector is transitioning from the third position to the fourth position in response to the single input.

17. The refuse vehicle of claim 16, further comprising a lifting system proximate the body and movable relative to the receptacle.

18. A refuse vehicle, comprising:
a chassis;
a body supported by the chassis and defining a receptacle configured to store refuse therein, the receptacle having a first end and an opposing second end, the receptacle pivotally coupled to the chassis and selectively movable between a first position and a second position, and wherein the second position is angularly offset from the first position;
a lock coupled to the body, wherein the lock is selectively repositionable between a locked position and an unlocked position;
a tailgate positioned at the second end of the receptacle, wherein the tailgate is pivotally coupled to the body and selectively repositionable between an open position and a closed position, wherein the tailgate is configured to be releasably secured in the closed position by the lock;
an ejector positioned within the receptacle, wherein the ejector is slidable within the receptacle between a third position that is spaced from the tailgate and a fourth position proximate the tailgate;
an actuator coupled to the body and the ejector, the actuator configured to transition the ejector between the third position and the fourth position; and
a second actuator coupled to the chassis, wherein the second actuator is selectively movable to transition the receptacle between the first position and the second position;
a processor configured to:
provide command signals to (a) selectively reconfigure the lock into the unlocked position to unlock the tailgate and (b) transition the ejector from the third position to the fourth position both in response to receiving a single input to thereby eject refuse from the receptacle without receiving multiple input commands; and
automatically receive the single input upon the refuse vehicle entering a geographically indicated location.

19. The refuse vehicle of claim 18, further comprising a lifting system proximate the body and movable relative to the receptacle.

20. A refuse vehicle, comprising:
a chassis;
a body supported by the chassis and defining a receptacle configured to store refuse therein, the receptacle having:
a first end;
an opposing second end;
a first position;
an angularly offset second position, wherein the receptacle is selectively repositionable between the first position and the angularly offset second position;
a lock coupled to the body, wherein the lock is selectively repositionable between a locked position and an unlocked position;
a tailgate positioned at the second end of the receptacle, wherein the tailgate is pivotally coupled to the body and selectively repositionable between an open position and a closed position, wherein the tailgate is configured to be releasably secured in the closed position by the lock;

an ejector positioned within the receptacle, wherein the ejector is slidable within the receptacle;

a processor configured to provide command signals to selectively reconfigure the lock into the unlocked position to unlock the tailgate in response to receiving a single input to thereby eject refuse from the receptacle without receiving multiple input commands;

an actuator coupled to the tailgate and the body, in communication with the processor, and configured to transition the tailgate from the closed position to the open position in response to the single input; and a second actuator coupled to the chassis and the receptacle, wherein the second actuator is selectively movable to transition the receptacle between the first position and the second position, and is in communication with the processor, wherein the processor is configured to receive the single input from a remote device, and wherein the processor is configured to automatically receive the single input upon the refuse vehicle entering a geographically indicated location.

\* \* \* \* \*